United States Patent
Miyamae

(10) Patent No.: US 9,425,691 B1
(45) Date of Patent: Aug. 23, 2016

(54) LOW THERMAL DESIGN FOR DC-DC CONVERTER

(71) Applicant: Cypress Semiconductor Corporation, San Jose, CA (US)

(72) Inventor: Toru Miyamae, Aichi (JP)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 0 days.

(21) Appl. No.: 14/866,172

(22) Filed: Sep. 25, 2015

Related U.S. Application Data

(60) Provisional application No. 62/180,677, filed on Jun. 17, 2015.

(51) Int. Cl.
*G05F 1/618* (2006.01)
*H02M 3/158* (2006.01)

(52) U.S. Cl.
CPC .................................... *H02M 3/158* (2013.01)

(58) Field of Classification Search
CPC ................................................... H02M 3/158
See application file for complete search history.

(56) References Cited

U.S. PATENT DOCUMENTS

| | | | |
|---|---|---|---|
| 6,437,462 B1 | 8/2002 | Maple et al. | |
| 6,597,157 B1* | 7/2003 | Boeckmann | G05F 1/618 323/242 |
| 7,492,208 B2* | 2/2009 | Tihanyi | H01L 27/0727 327/374 |
| 7,994,769 B2* | 8/2011 | Ohtake | H02M 3/1584 323/283 |
| 8,120,338 B2* | 2/2012 | Kawagishi | G05F 1/56 323/269 |
| 8,467,197 B2 | 6/2013 | Perisic et al. | |
| 2007/0216387 A1* | 9/2007 | Matsuo | H02M 3/158 323/282 |
| 2015/0113294 A1 | 4/2015 | Zhang et al. | |

OTHER PUBLICATIONS

International Search Report for International Application No. PCT/US16/17495 dated May 5, 2016; 2 pages.

Written Opinion of the International Searching Authority for International Application No. PCT/US16/17495 dated May 5, 2016; 6 pages.

* cited by examiner

*Primary Examiner* — Emily P Pham

(57) ABSTRACT

A DC-DC converter includes an input terminal Pin receiving an voltage input, switching circuits connected in parallel between the input terminal Pin and ground, an output terminal Pout from which converted voltage is output, and a controller that turns the switching circuits on in a predetermined cycle by inputting, into each of the switching circuits, a control signal that turns the switching circuits on individually.

20 Claims, 18 Drawing Sheets

LOW THERMAL DESIGN FOR DC-DC CONVERTER

PRIORITY

This application claims the priority and benefit of U.S. Provisional Application No. 62/180,677, filed on Jun. 17, 2015, the entire content of which is incorporated by reference herein.

TECHNICAL FIELD

This disclosure relates to DC-DC converters and methods of operation the same, more particularly, to DC-DC converters incorporated with low thermal design for high frequency switching.

BACKGROUND

One type of DC-DC converters is the switching regulator. Switching regulators, which have high conversion efficiency, are widely used as voltage converters in batteries for providing voltage to a variety of control circuits (loads). For example, switching regulators are also used in automotive power supplies.

One conventional multi-phase DC-DC converter uses a plurality of point of load (POL) converters, taking into consideration a balance between the demands for a higher switching frequency and thermal design. The DC-DC converter disclosed in this conventional embodiment, however, may lead to an increase in the number of parts. Such an increase in the number of parts may increase the area for mounting the parts and raise manufacturing costs.

In another conventional switching circuit device, switches may include a plurality of MOSFETs with different gate widths disposed in parallel. With the conventional switching circuit device, however, differences in the impedance of the gate wiring and in the on resistance of each switch may lead to the charge current of parasitic capacitance concentrating in one of the elements. The element heats up as a result, and concentrated energy losses may occur.

DETAILED DESCRIPTION

Desirable characteristics of a switching regulator include, for example, the ability to supply a large current, the ability to control a high switching frequency, and little loss due to heat generation or the like. There is a trade-off, however, between a large current supply capability and a high switching frequency on the one hand and a reduction in energy loss due to heat on the other. For example, if the on resistance of the switching circuit is reduced in order to supply a large current, the parasitic capacitance and the charge current increase, which may lead to heat generation. Furthermore, if the switching circuit is turned on frequently because a high switching frequency is required due to restrictions on the environment of use (for example, in vehicle-mounted devices that need to avoid interference from other radio waves), then the charge current of parasitic capacitance flows each time the switching circuit is turned on, and the resulting heat generation and energy loss due to heat generation occur even more often. At the same time, a heat design that does not generate excessive heat is desirable in a switching regulator.

It would therefore be helpful to provide a DC-DC converter that may reduce energy loss due to heat, especially during high frequency switching.

An exemplary DC-DC converter according to this disclosure includes: an input terminal receiving voltage input; a plurality of switching circuits connected in parallel between the input terminal and a ground; an output terminal outputting converted voltage; and a controller configured to turn the switching circuits on in a predetermined cycle by inputting, into each of the switching circuits, a control signal that turns the switching circuits on individually.

In this exemplary DC-DC converter, the controller may perform control to turn the switching circuits on sequentially.

In this exemplary DC-DC converter, the controller may repeat the control.

In this exemplary DC-DC converter, the switching circuits may be high-side switching circuits.

In this exemplary DC-DC converter, the switching circuits may be low-side switching circuits.

The DC-DC converter and method of control thereof according to the following embodiments allow for a reduction in energy loss due to heat.

Figure 17:
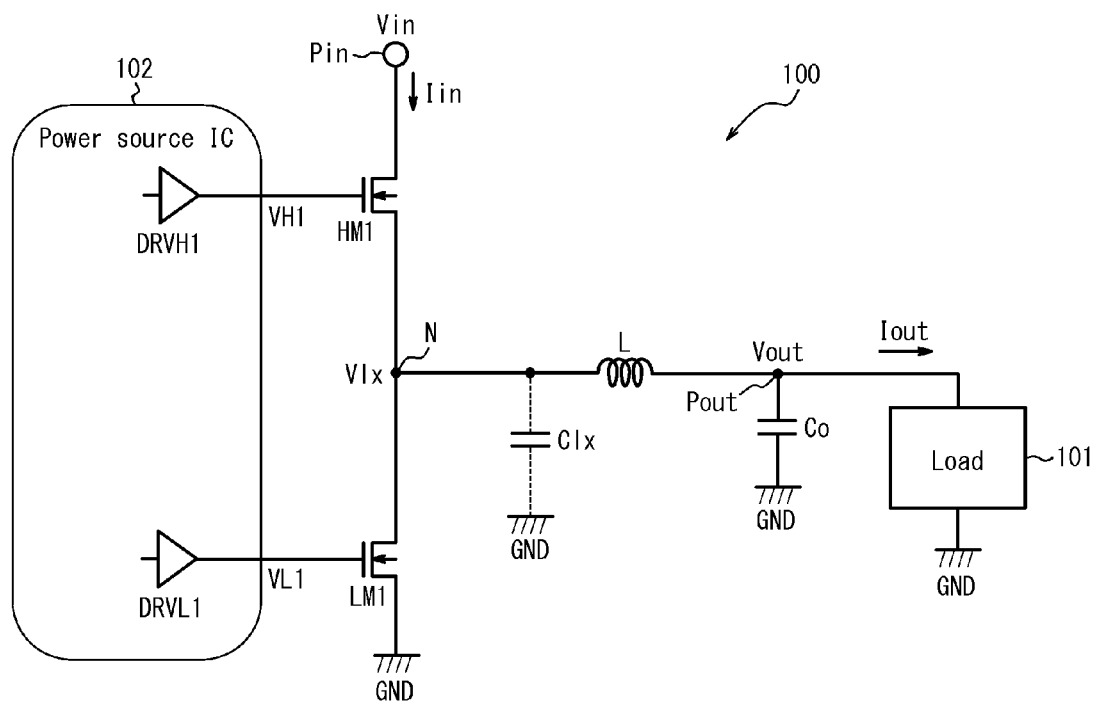
FIG. 17 illustrates an example of the circuit in the DC-DC converter.

FIG. 17 illustrates an example of a DC-DC converter circuit. Based on input voltage Vin supplied to an input terminal Pin, a DC-DC converter 100 outputs a desired output voltage Vout. The DC-DC converter 100 illustrated in FIG. 17 is a step-down DC-DC converter that outputs an output voltage Vout that is lower than the input voltage Vin.

The output voltage Vout is supplied to a load 101 connected to an output terminal Pout. The load 101 is connected to a power source wire at a lower potential than the input voltage Vin (in FIG. 17, a ground (GND) wire).

The DC-DC converter 100 includes a high-side switching circuit HM1 and a low-side switching circuit LM1 for temporally dividing the input voltage Vin and also includes an inductor L and capacitor C0 that form a smoothing filter for smoothing the temporally divided input voltage Vin and outputting the result to the load 101. In one embodiment, the high-side switching circuit HM1 is a switching circuit positioned on the power source side of the load 101, and the low-side switching circuit LM1 is a switching circuit positioned on the ground side of the load 101. Furthermore, the DC-DC converter includes a power source IC102 that transmits control signals for controlling the switching circuits HM1 and LM1.

The switching circuits HM1 and LM1 may, for example, be Metal-Oxide-Semiconductor Field-Effect Transistors (MOSFETs). The drain of the switching circuit HM1 is connected to the input terminal Pin. The source of the switching circuit HM1 is connected to the drain of the switching circuit LM1. The source of the switching circuit LM1 is connected to the ground GND via a node N. The inductor L is connected to the node N. The potential of the node N is Vlx. Parasitic capacitance Clx may exist between the node N and the inductor L.

IC102 includes a driver circuit DRVH1 connected to the high-side switching circuit HM1 and a driver circuit DRVL1 connected to the switching circuit LM1. In one embodiment, DC-DC converter 100 outputs the desired output voltage Vout, the driver circuits DRVH1 and DRVL1 respectively output control signals VH1 and VL1 for on/off control of the switching circuits HM1 and LM1. The control signals VH1 and VL1 are, for example, Pulse Width Modulation (PWM) signals that have a pulse width corresponding to the duty cycle for turning the switching circuits HM1 and LM1 on. The pulse width of the control signals VH1 and VL1 is, for example, controlled by a non-illustrated controller provided in the IC102.

Figure 18:
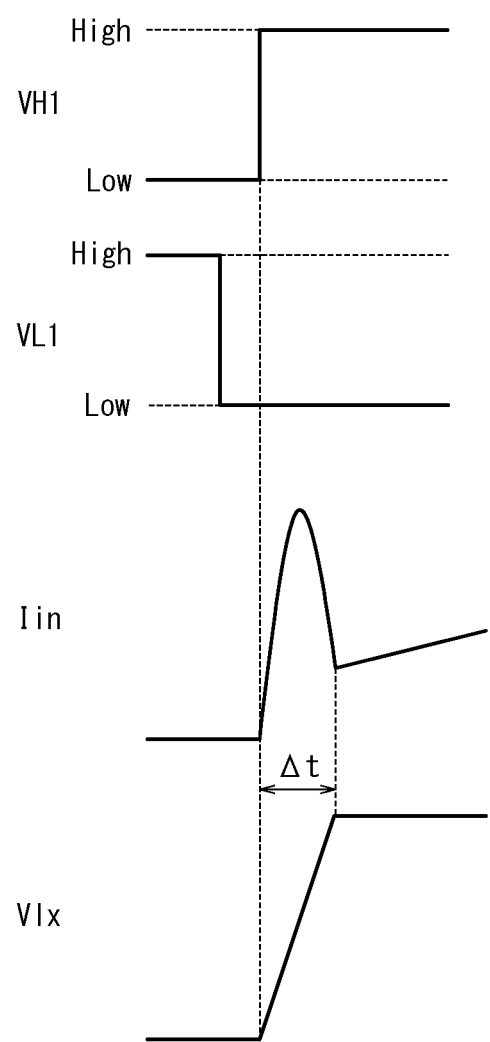
FIG. 18 illustrates the relationship between input current and potential at each node in the circuit in FIG. 17.

FIG. 18 illustrates the relationship among the PWM signals VH1 and VL1 generated by the driver circuits DRVH1 and DRVL1, the input current Iin input from the input terminal Pin, and the potential Vlx at the node N. As illustrated in FIG. 18, during the time Δt immediately after the switching circuit HM1 is turned on by the PWM signal VH1, a larger input current Iin than when the switching circuit HM1 is off flows through the switching circuit HM1, and the potential Vlx of the node N rises.

Here, in order to pass a relatively large current through the switching circuits HM1 and LM1, the on resistance of the MOSFETs used as the switching circuits HM1 and LM1 is preferably low. As the on resistance of the MOSFET is lower, however, the parasitic capacitance Clx increases, which causes the charge current to rise, thereby increasing energy loss due to heat generation. As the switching frequency is higher, current flows through the switching circuit HM1 more often, thereby increasing the frequency of energy loss incidents due to the heat generation.

Furthermore, upon an increase in the input voltage Vin, the energy loss during the time Δt immediately after the switching circuit HM1 is turned on also increases. For example, when the loss per unit time is 180 W and Δt is 5 ns, then performing on/off control of the switching circuit HM1 at a switching frequency of 2 MHz yields a power of 1.8 W applied to the switching circuit HM1. In this case, if for example a MOSFET that generates heat per power at a ratio of 50° C./W is used, the MOSFET generates 90° C. of heat.

Embodiments for reducing such heat generation and the resulting energy loss are described below with reference to the drawings.

Figure 1:
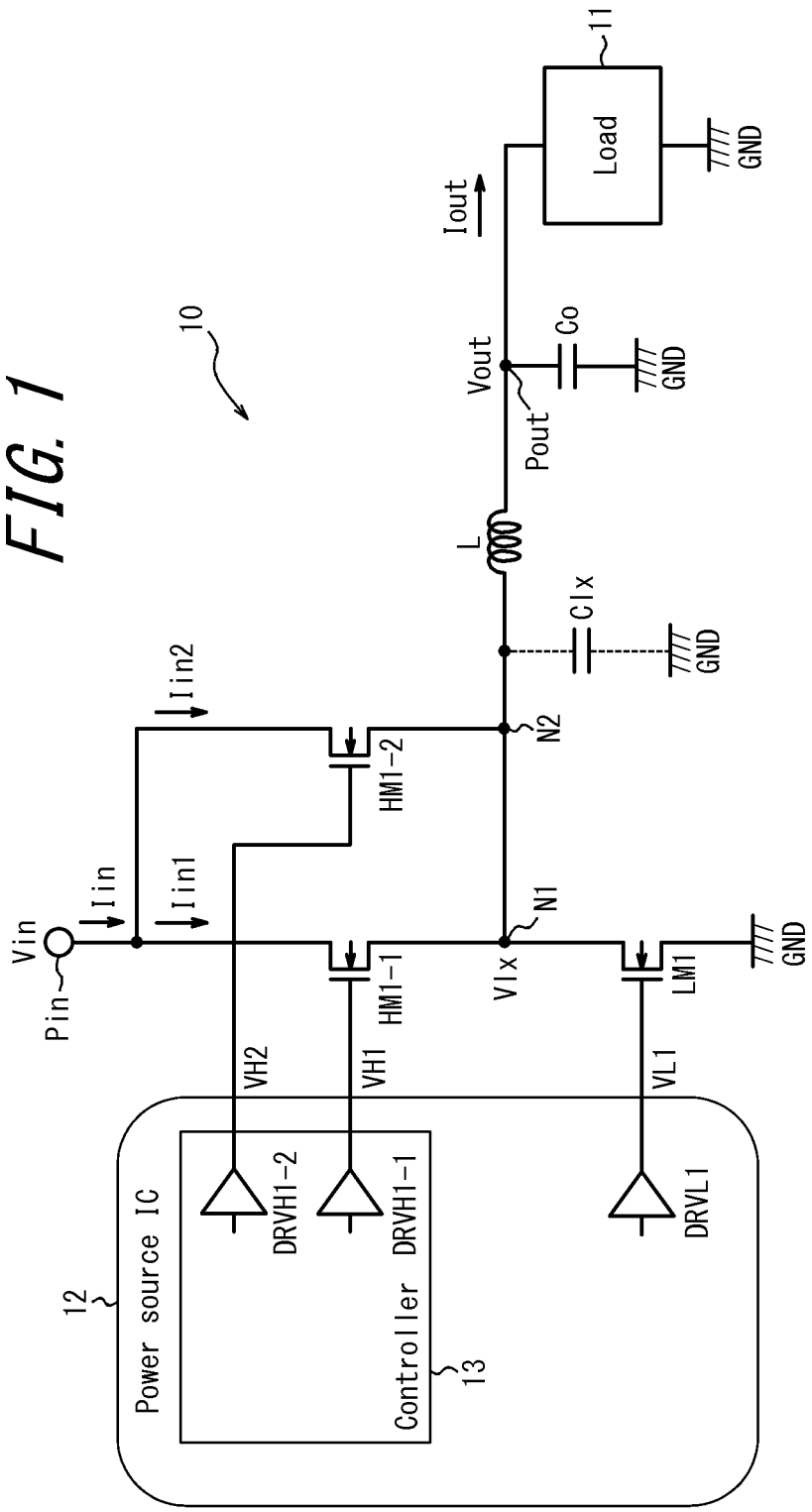
FIG. 1 illustrates an example of a circuit in a DC-DC converter according to one of the disclosed embodiments.

FIG. 1 illustrates an example of a circuit in a DC-DC converter according to one of the disclosed embodiments. Based on input voltage Vin supplied to an input terminal Pin, a DC-DC converter 10 outputs a desired output voltage Vout. The DC-DC converter 10 illustrated in FIG. 1 is a step-down DC-DC converter that outputs an output voltage Vout that is lower than the input voltage Vin. The output voltage Vout is supplied to a load 11 connected to an output terminal Pout. The load 11 may be connected to a ground (GND) wire.

The DC-DC converter 10 includes high-side switching circuits HM1-1 and HM1-2 and a low-side switching circuit LM1 for temporally dividing the input voltage Vin and also includes an inductor L and capacitor C0 that form a smoothing filter for smoothing the temporally divided input voltage Vin and outputting the result to the load 11. Here, the high-side switching circuit is a switching circuit positioned on the power source side of the load 11, and the low-side switching circuit is a switching circuit positioned on the ground side of the load 11. Furthermore, the DC-DC converter 10 includes IC12 that transmits control signals, such as VH1, VH2 and VL1 for controlling the switching circuits HM1-1, HM1-2, and LM1. In this embodiment, the high-side switching circuits HM1-1 and HM1-2 of the DC-DC converter 10 are coupled in parallel between the input terminal Pin and a node N1.

In one embodiment, the switching circuits HM1-1, HM1-2, and LM1 may, for example, be MOSFETs. It should, however, be appreciated that other types of transistors, such as p-channel FETs, and combinations of different types of transistors, capacitors, resistors may be utilized. The drain of the switching circuit HM1-1 and the drain of the switching circuit HM1-2 are connected to the input terminal Pin. The input current that is input from the input terminal Pin is labeled Iin, and within the input current Iin, the input current flowing to the switching circuit HM1-1 is labeled Iin1, whereas the input current flowing to the switching circuit HM1-2 is labeled Iin2. The source of the switching circuit HM1-1 and the source of the switching circuit HM1-2 are each connected to the drain of the switching circuit LM1 via the node N1. The inductor L is connected to the node N1. Furthermore, the source of the switching circuit LM1 is connected to the ground (GND) wire. The potential of the node N1 and the node N2 is Vlx. In FIG. 1, parasitic capacitance Clx exists between the node N2 and the inductor L.

IC12 includes a controller 13. The controller 13 further includes high-side driver circuits DRVH1-1 and DRVH1-2 and a low-side driver circuit DRVL1. In the controller 13, so that the DC-DC converter 10 outputs the desired output voltage Vout, the driver circuits DRVH1-1, DRVH1-2, and DRVL1 respectively output control signals VH1, VH2, and VL1 for on/off control of the switching circuits HM1-1, HM1-2, and LM1. The control signals VH1, VH2, and VL1 are, for example, PWM signals that have a pulse width corresponding to the duty cycle for turning the switching circuits HM1-1, HM1-2, and LM1 on. The pulse width of the control signals VH1 and VL1 output by the driver circuits DRVH1-1 and DRVH1-2 is, for example, controlled by the controller 13. The pulse width of the control signal VL1 in the driver circuit DRVL1 is controlled by a non-illustrated controller. Alternatively, the pulse width of the control signal VL1 in the driver circuit DRVL1 may be controlled by the controller 13.

Figure 2:
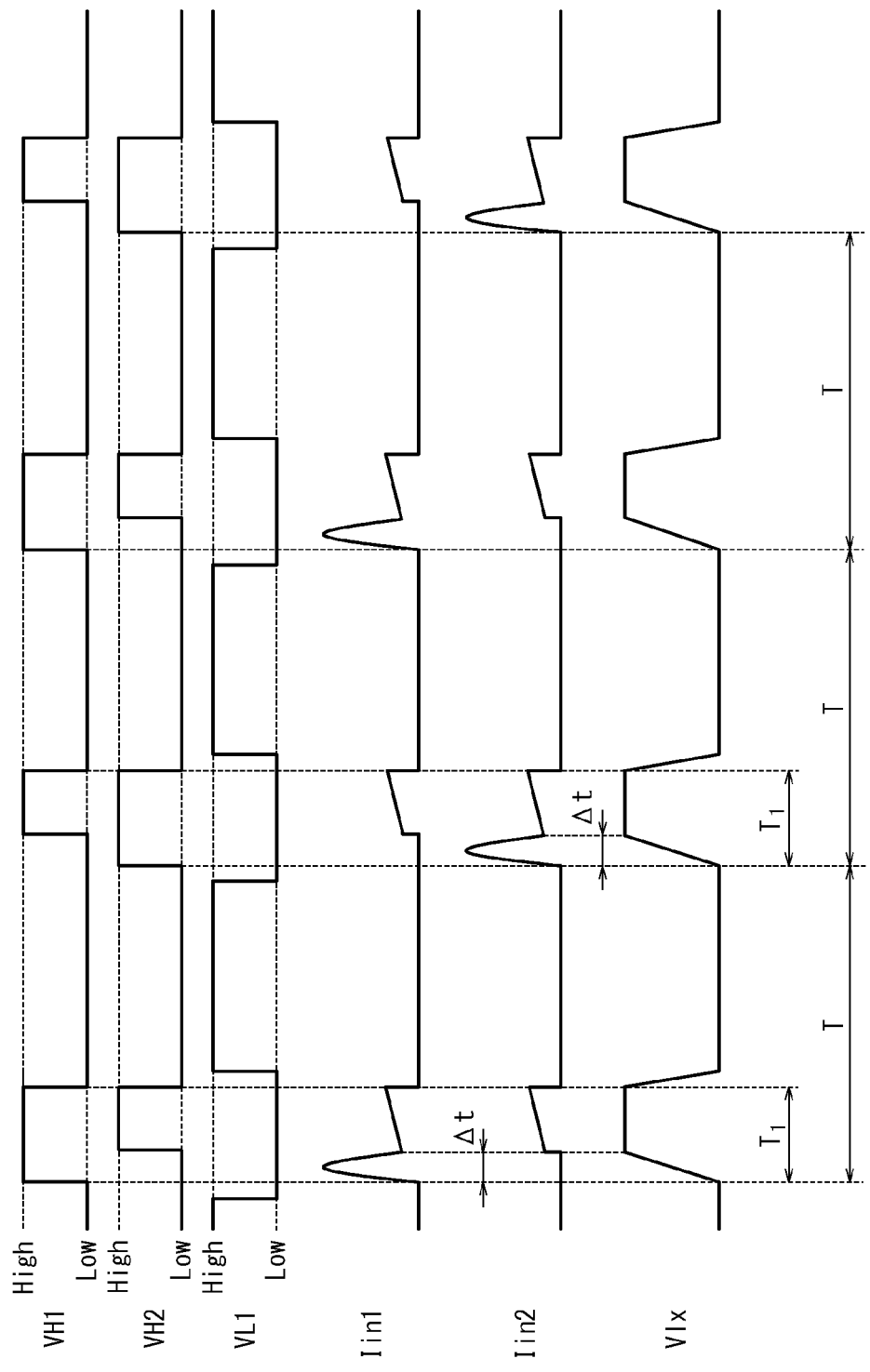
FIG. 2 is a waveform diagram illustrating the relationship between input current and potential at each node in a driver circuit.

FIG. 2 illustrates the relationship among the control signals VH1, VH2, and VL1 generated during a switching cycle T by the driver circuits DRVH1-1, DRVH1-2, and DRVL1, the input currents Iin1 and Iin2 respectively input into the switching circuits HM1-1 and HM1-2 from the input terminal Pin, and the potential Vlx at the node N1. In this embodiment, the patterns of on/off behavior of the switching circuits HM1-1 and HM1-2 are exchanged so that the duty cycles alternate each cycle.

FIG. 2 illustrates an example of the patterns of on/off behavior of the switching circuits HM1-1 and HM1-2 alternating in each cycle T. Here, the patterns that alternate are an earlier pattern, in which the switching circuit is turned on at the start of the cycle and is turned off after a predetermined time $T_1$, and a later pattern, in which the switching circuit is turned on once a time Δt has elapsed after the start of the cycle and is turned off after the predetermined time $T_1$. In this embodiment, when the PWM signal VH1 having the earlier pattern is input into the switching circuit HM1-1, the PWM signal VH2 having the later pattern is input into the switching circuit HM1-2. Conversely, when the PWM signal VH1 having the later pattern is input into the switching circuit HM1-1, the PWM signal VH2 having the earlier pattern is input into the switching circuit HM1-2.

The PWM signal VL1 is input into the switching circuit LM1 so that the switching circuit LM is on during the predetermined time $T_1$ in each cycle T. In the example illustrated in FIG. 2, a PWM signal VL1 that controls the switching circuit LM1 to be on during a certain length of time before and after the predetermined time $T_1$ is input into the switching circuit LM1.

When the switching circuit HM1-1 or the switching circuit HM1-2 turns on, the potential Vlx of the node N1 rises during the time Δt. In the example illustrated in FIG. 2, the potential Vlx starts to rise at the start of the cycle. When the switching circuit HM1-1 or the switching circuit HM1-2 turns off, the potential Vlx of the node N1 returns to the value before the potential rose.

By alternating PWM signals with different control patterns for input into the switching circuits HM1-1 and HM1-2 as described above, the waveforms of Iin1 and Iin2 that flow through the switching circuits HM1-1 and HM1-2 switch each cycle. Therefore, in the switching circuits HM1-1 and HM1-2, the timing of heat generation resulting from current is distributed. With this approach, as compared to the case when current flows to one high-side switching circuit in every cycle, the amount of heat generated overall in the switching circuits HM1-1 and HM1-2 can be suppressed, and energy loss due to heat can be reduced.

Figure 3:
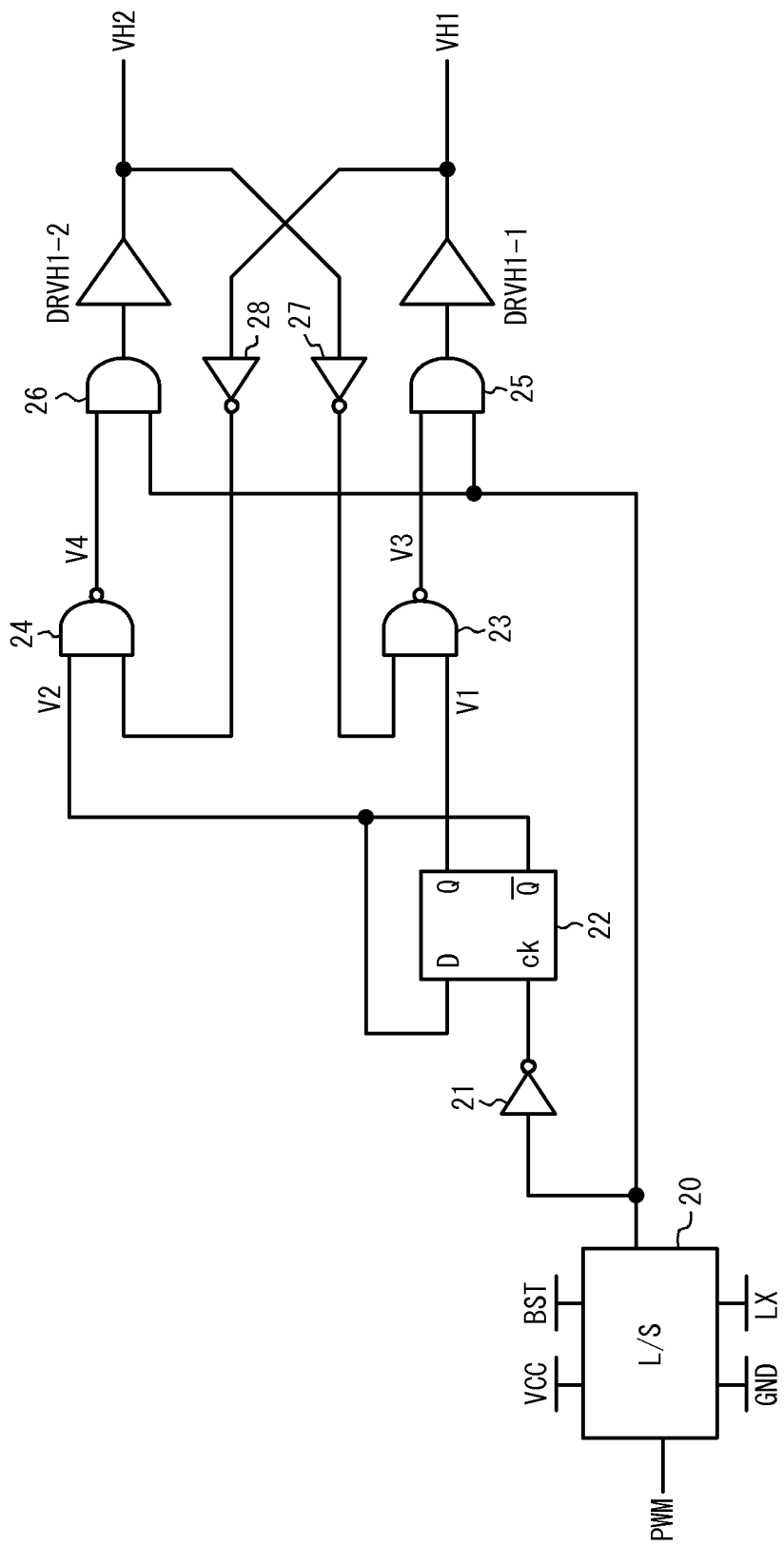
FIG. 3 illustrates an example of a controller.

FIG. 3 illustrates an example of the controller 13. The controller 13 for example includes a level shift circuit 20, NOT circuits 21, 27, and 28, a latch circuit 22, NAND circuits 23 and 24, AND circuits 25 and 26, and the driver circuits DRVH1-1 and DRVH1-2.

The level shift circuit 20 uses the input from the various power sources VCC, GND, BST, and LX to amplify and output the provided PWM signal. The PWM signal amplified by the level shift circuit 20 is inverted by the NOT circuit 21 and input into the latch circuit 22. In this embodiment, the latch circuit 22 is a so-called D latch circuit. It will be appreciated that other latch circuit(s) may be used in latch circuit 22.

A signal V1 output as the output Q of the latch circuit 22 is provided to the NAND circuit 23. Also, the signal VH2 output by the driver circuit DRVH1-2 is inverted by the NOT circuit 27 and provided to the NAND circuit 23. The NAND circuit 23 inverts the logical conjunction of the provided signals, i.e. the signal V1 and the inverted signal VH2, and outputs the resulting signal V3.

A signal V2 output as the inversion of the output Q of the latch circuit 22 is provided to the NAND circuit 24. Also, the signal VH1 output by the driver circuit DRVH1-1 is inverted by the NOT circuit 28 and provided to the NAND circuit 24. The NAND circuit 24 inverts the logical conjunction of the provided signals, i.e. the signal V2 and the inverted signal VH1, and outputs the resulting signal V4.

The AND circuit 25 outputs the logical conjunction of the signal provided by the level shift circuit 20 and the signal V3 output by the NAND circuit 23 to the driver circuit DRVH1-1. The AND circuit 26 outputs the logical conjunction of the signal provided by the level shift circuit 20 and the signal V4 output by the NAND circuit 24 to the driver circuit DRVH1-2.

Figure 4:
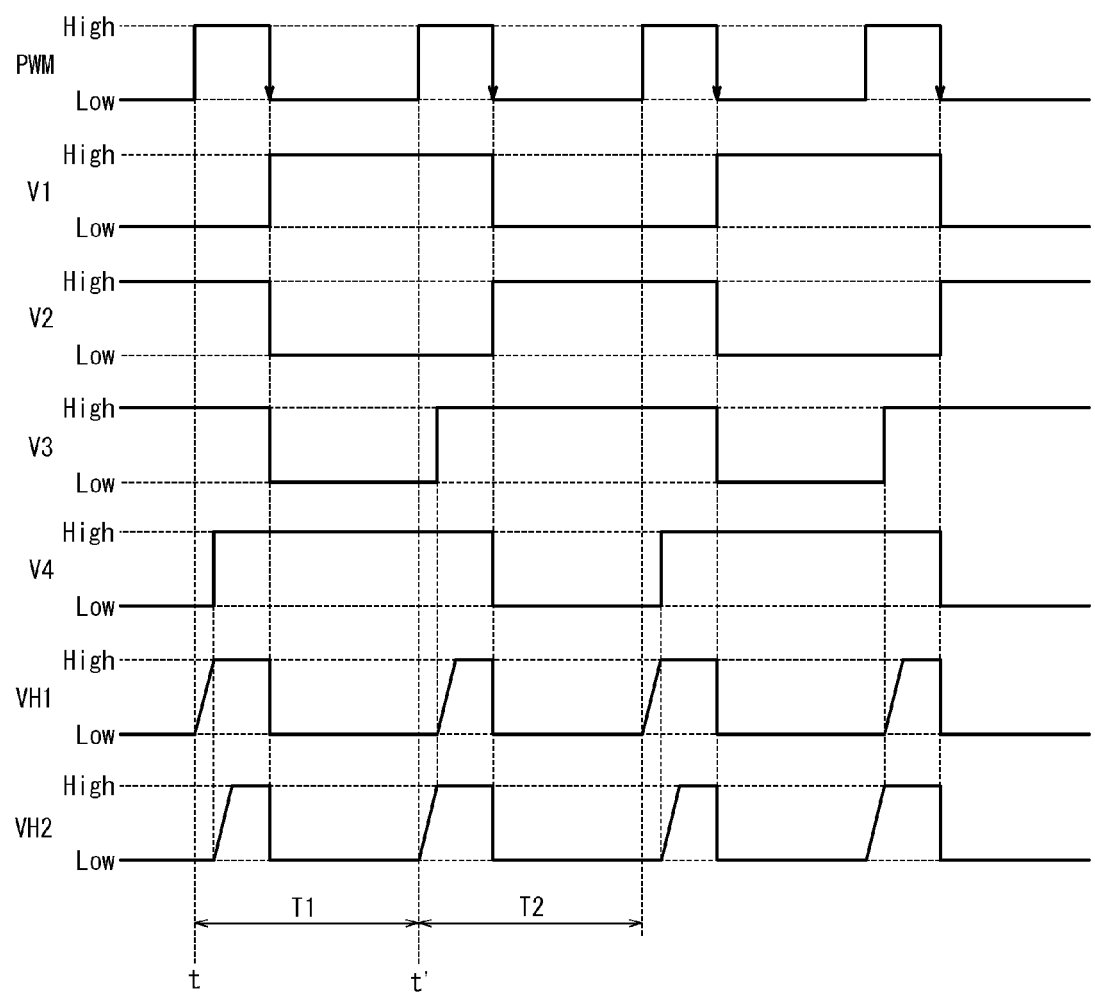
FIG. 4 is a waveform diagram illustrating the relationship between signals in the configuration illustrated in FIG. 3.

FIG. 4 is a waveform diagram illustrating the relationship between signals in the configuration illustrated in FIG. 3. The waveform diagram in FIG. 4 illustrates the relationship between the PWM signal input to and amplified by the level shift circuit 20, the signals V1 and V2 output by the latch circuit 22, the signal V3 output by the NAND circuit 23, the signal V4 output by the NAND circuit 24, and the signals VH1 and VH2 output respectively from the driver circuits DRVH1-1 and DRVH1-2. The timing at which the PWM signal changes from Low to High is described below as being the starting point of each cycle.

The signal output as the inversion of the output Q of the latch circuit 22 is input as the input D of the latch circuit 22. Therefore, the signal V1 that is output as the output Q switches from High to Low or vice-versa each time the PMW signal changes from High to Low. The signal V2 output as the inversion of the output Q also switches from High to Low or vice-versa each time the PMW signal changes from High to Low. The signal V2 is the logical inversion of the signal V1. Hence, when the signal V1 is High, the signal V2 is Low, and when the signal V1 is Low, the signal V2 is High.

When the signal V1 is Low, the signal V3 output by the NAND circuit 23 is High. When the signal V2 is High and the signal VH1 is Low, the signal V4 output by the NAND circuit 24 is Low. In this state, at the start of cycle T1 (at time t in FIG. 4), when the PWM signal changes from Low to High, the signal V4 input into the AND circuit 26 is Low, and therefore the signal VH2 also remains Low without changing. When the PWM signal changes from Low to High, however, the signal V3 input into the AND circuit 25 is High, and therefore the signal VH1 changes from Low to High. Upon the signal VH1 changing to High, the signal V4 output by the NAND circuit 24 changes to High. Accordingly, after the signal VH1 changes to High, the signal VH2 output by the AND circuit 26 upon input of the signal V4 changes to High later than VH1. As a result of the signal VH1 changing to High in this way, in cycle T1 that starts at time t, the switching circuit HM1-1 turns on first, and the switching circuit HM1-2 turns on next.

Upon the PWM signal changing from High to Low, the logical conjunction in each of the AND circuits 25 and 26 becomes Low, and the signal VH1 and signal VH2 each change from High to Low. At the same time, the High and Low states of the signal V1 and the signal V2 are exchanged, and these signals are input into the NAND circuits 23 and 24. At this time, the signals VH1 and VH2 are in a High state, and their inverted signals, i.e. Low signals, are output by the NOT circuits 27 and 28 and respectively input into the NAND circuits 23 and 24. As a result, High signals are transmitted to the AND circuits 25 and 26 respectively from the NAND circuits 23 and 24. Hence, the logical conjunction of a High signal and the PWM signal, i.e. Low signals VH1 and VH2, is output by the AND circuits 25 and 26. In response, the switching circuit HM1-1 and the switching circuit HM1-2 thus turn off.

In cycle T2 that follows cycle T1, the signal VH2 changes from Low to High at the start time t' of the cycle. As a result of the signal VH2 changing to High in this way, in cycle T2, the switching circuit HM1-2 turns on first, and the switching circuit HM1-1 turns on next with a delay. In this embodiment, cycles are thus repeated to successively change the signals VH1 and VH2 to High, with the order of the signals alternating. As a result, the switching circuit HM1-1 and the switching circuit HM1-2 are successively turned on in alternating order. Upon the PWM signal changing from High to Low, as in cycle T1, the switching circuit HM1-1 and the switching circuit HM1-2 turn off.

In this embodiment, the cycles T1 and T2 are alternately repeated.

Figure 5:
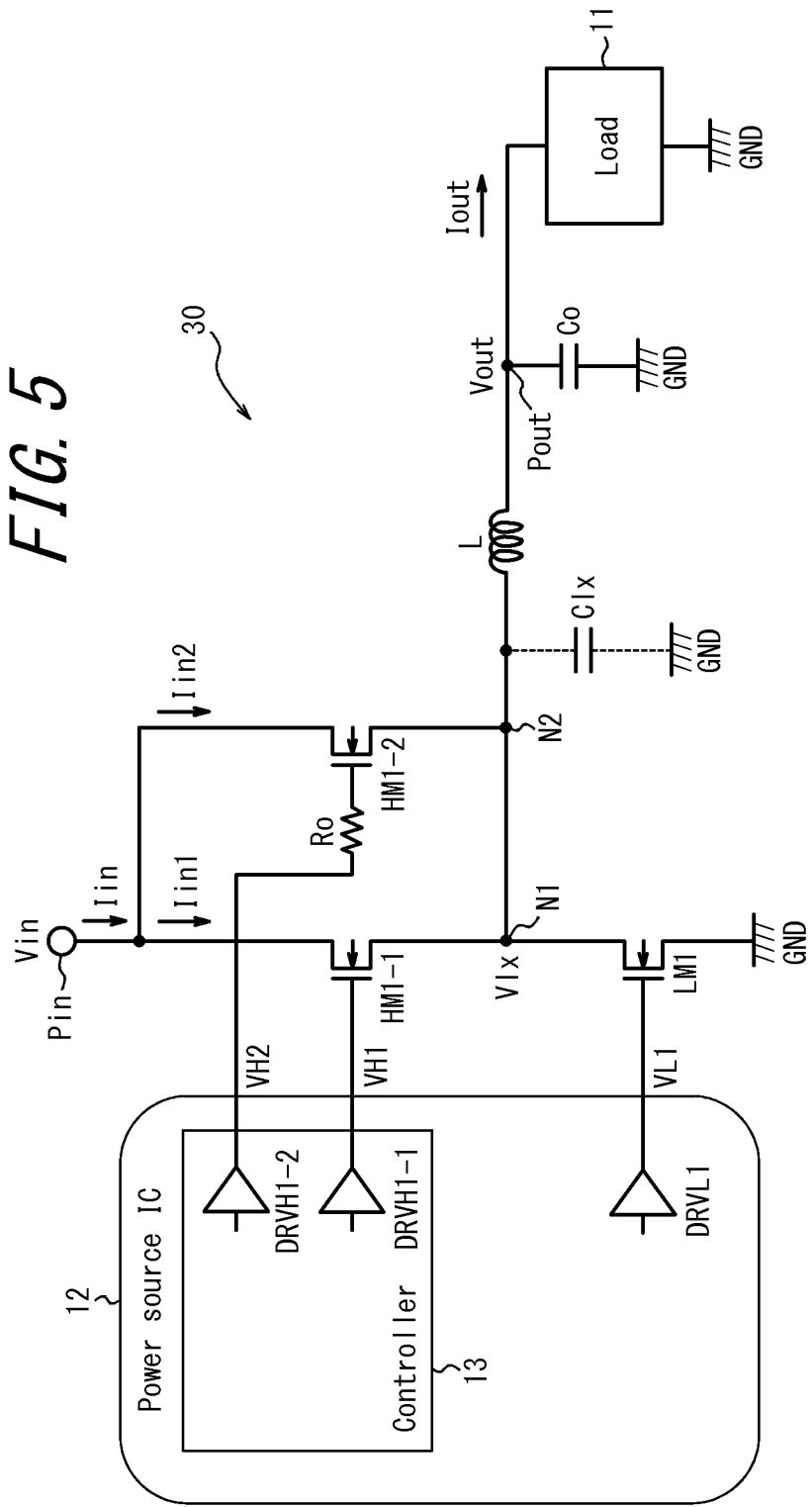
FIG. 5 illustrates an example of a DC-DC converter.

FIG. 5 illustrates an example within the present embodiment. In this example, a resistor is disposed on the control signal input side of a high-side switching circuit that is disposed in parallel in the DC-DC converter. For example, in a DC-DC converter 30, a resistor RO is connected to the switching circuit HM1-2. The remaining structure is the same as in FIG. 1. In this example, the input voltage Vin is 18.0 V, the output voltage Vout is 5.7 V, the output current Iout is 2.5 A, and the switching frequency fsw is 2.2 MHz.

Figure 6:
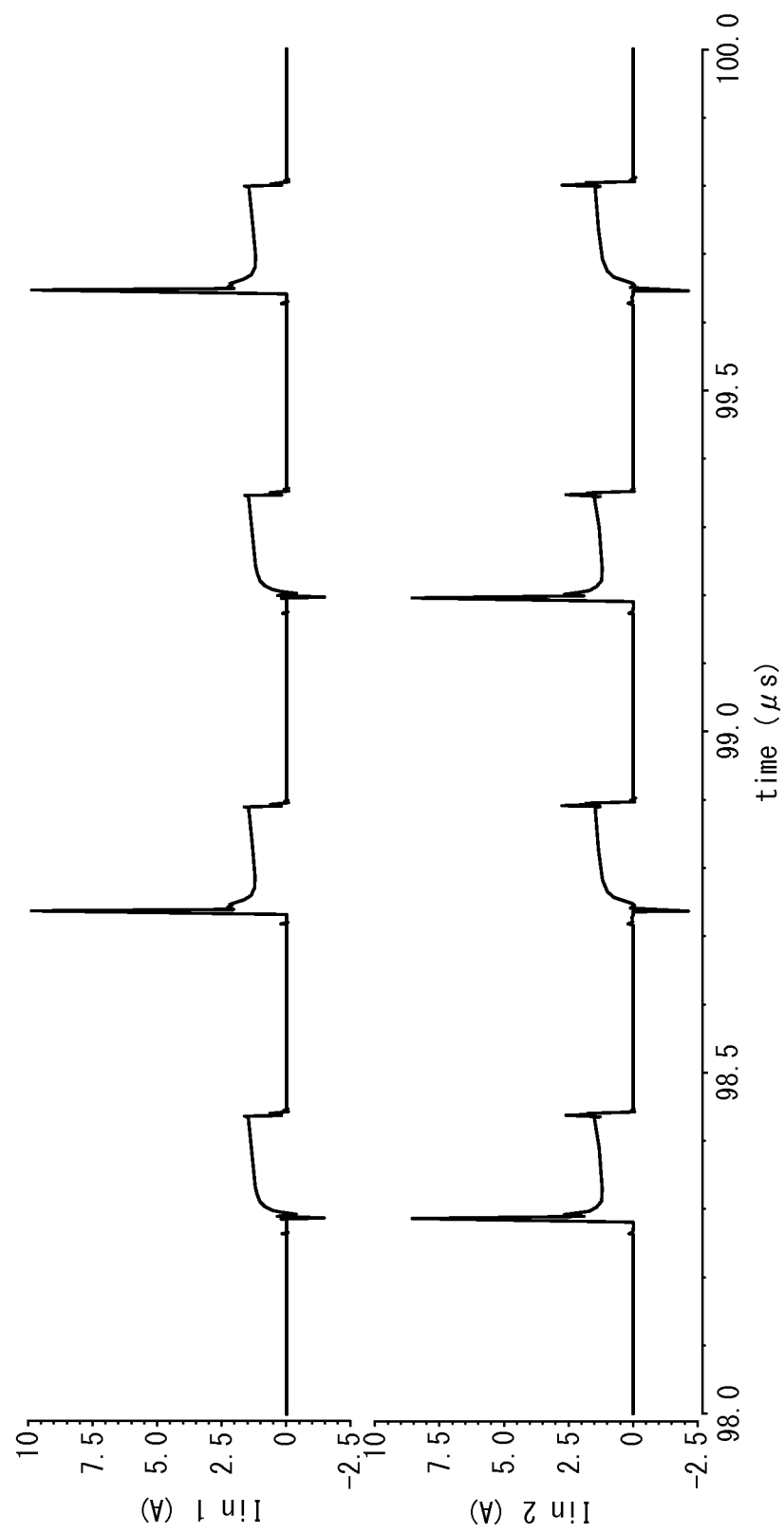
FIG. 6 illustrates the current that flows in the switching circuits in the example illustrated in FIG. 5.

FIG. 6 illustrates the current that flows in the switching circuits HM1-1 and HM1-2 in the example illustrated in FIG. 5. As is clear from FIG. 6, the currents Iin1 and Iin2 flowing in the switching circuits HM1-1 and HM1-2 alternately peak, and the peaks have values of approximately 10 A and 8.5 A respectively when the control signals VH1 and VH2 are High. Therefore, as compared to when there is only one high-side switching circuit, current does not flow in one of the switching circuits for an extended period of time in the DC-DC converter 30, thus avoiding a situation in which only one of the switching circuits generates heat for a longer time than another switching circuit. This approach also reduces the energy loss due to heat.

In a vehicle-mounted electronic device, there is a demand for a high-speed switching frequency of 2 MHz or more in order to avoid interference with the AM radio-frequency range. According to this embodiment, heat generation and the resulting energy loss can be reduced even at a high switching frequency. Furthermore, according to this embodiment, a high switching frequency and a reduction in energy loss due to heat can both be achieved with a simple structure. Therefore, manufacturing costs can be reduced while also contributing to a reduction in device size.

Figure 7:
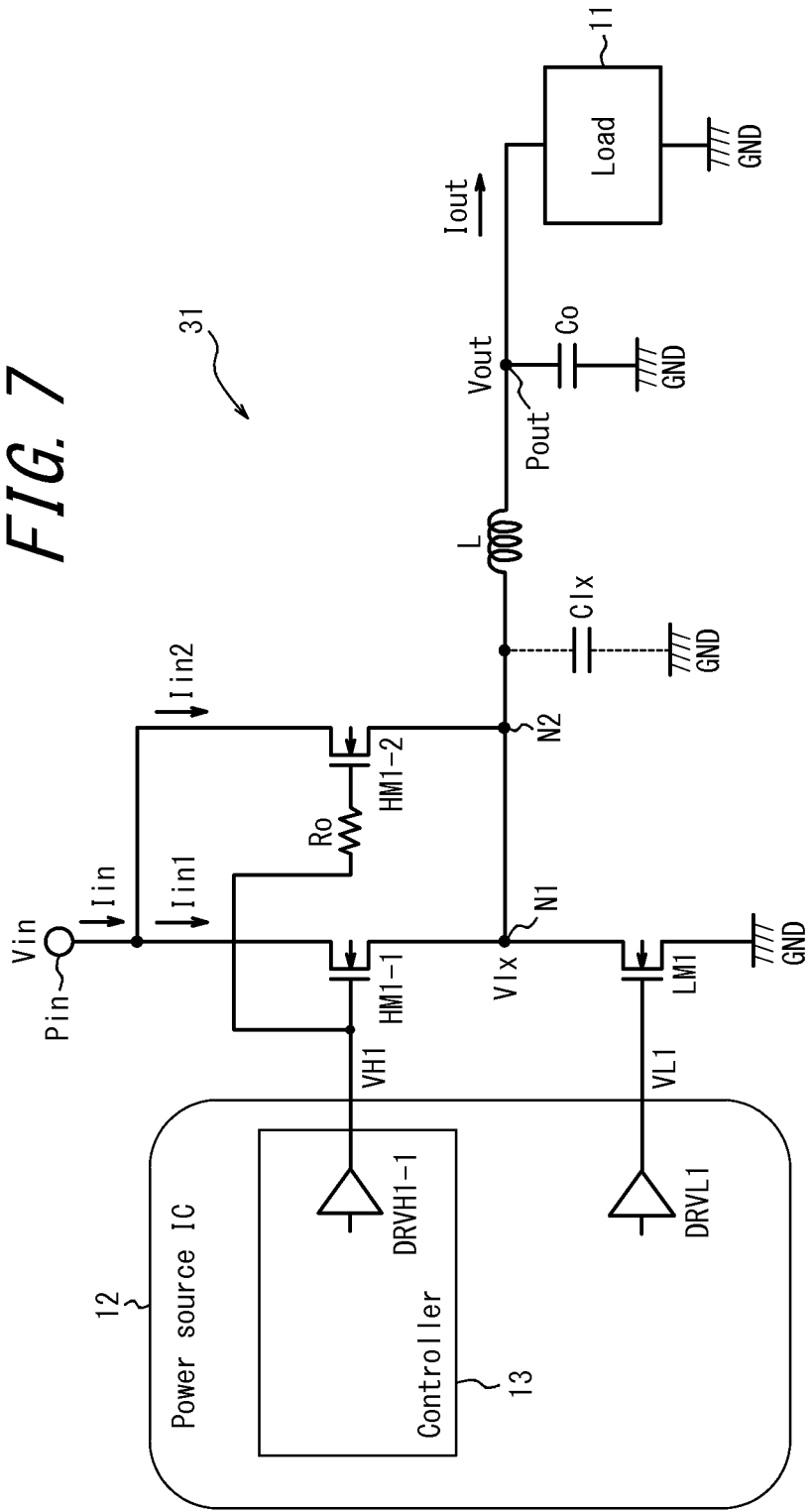
FIG. 7 illustrates a comparative example for comparison with the example illustrated in FIG. 5.

FIG. 7 illustrates a comparative example for comparison with the DC-DC converter in FIG. 5. The DC-DC converter 31 illustrated in the circuit diagram of FIG. 7 differs from the DC-DC converter 30 in FIG. 5 in that the high-side switching circuit HM1-1 and switching circuit HM1-2 disposed in parallel are controlled by one signal VH1 supplied by one driver circuit DRVH1-1. Like the DC-DC converter 30 in FIG. 5, the input voltage Vin in this example is 18.0 V, the output voltage Vout is 5.7 V, the output current Iout is 2.5 A, and the switching frequency fsw is 2.2 MHz in the DC-DC converter 31 in FIG. 7 as well.

Figure 8:
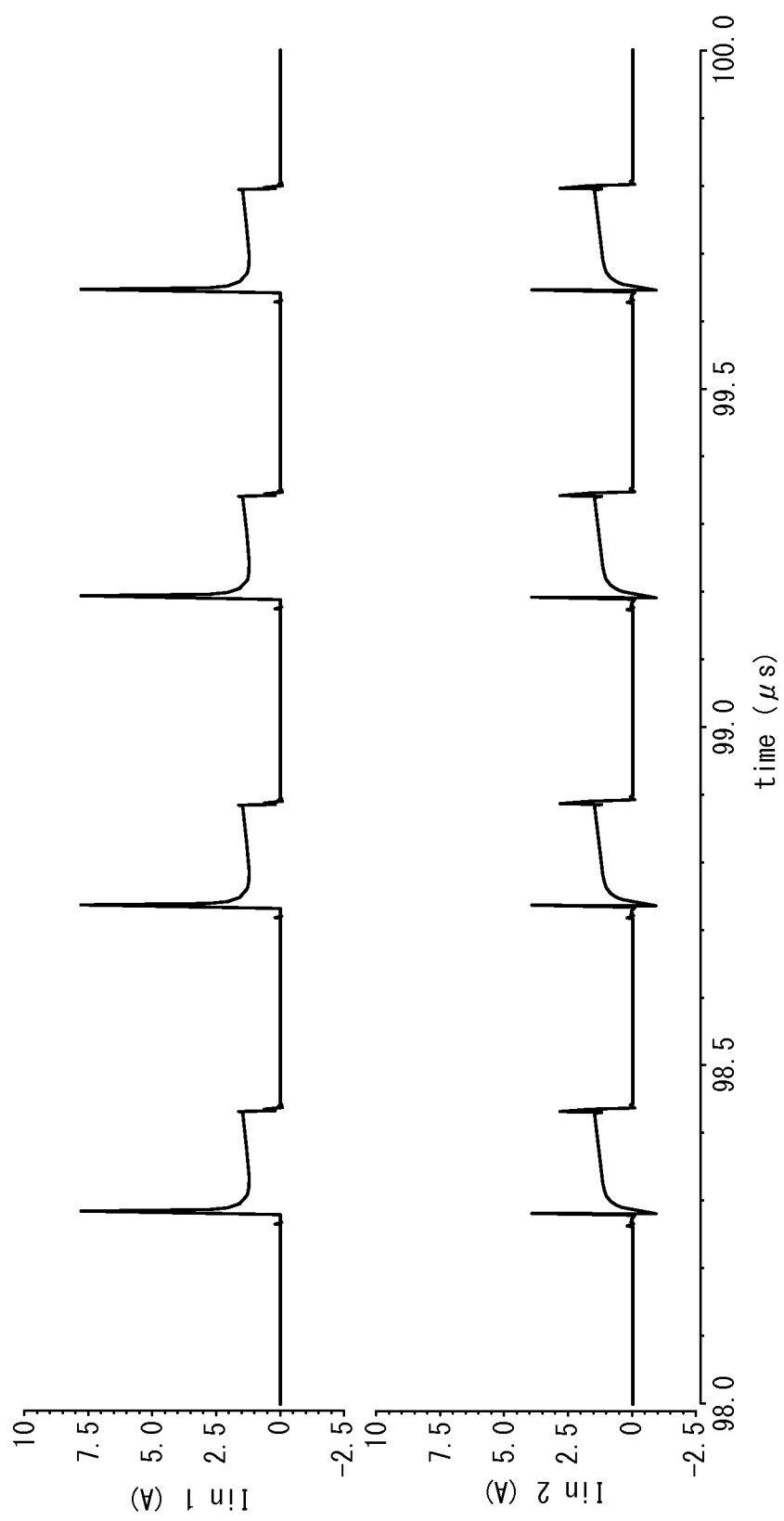
FIG. 8 illustrates the current that flows in the switching circuits in the comparative example illustrated in FIG. 7.

FIG. 8 illustrates the current that flows in the switching circuits HM1-1 and HM1-2 in the circuit illustrated in FIG. 7. As illustrated in FIG. 8, current flows at the same time into the switching circuits HM1-1 and HM1-2 that are controlled simultaneously by the same signal VH1. By disposing the resistor Ro by the switching circuit HM1-2, the peak of the current Iin2 that flows in the switching circuit HM1-2 (approximately 4 A) is lower than the peak of the current Iin1 that flows in the switching circuit HM1-1 (approximately 8 A). In other words, a larger current concentrates and flows in the switching circuit HM1-1 than in the switching circuit HM1-2. As a result, the switching circuit HM1-1 may generate much more heat than the switching circuit HM1-2.

Figure 9:
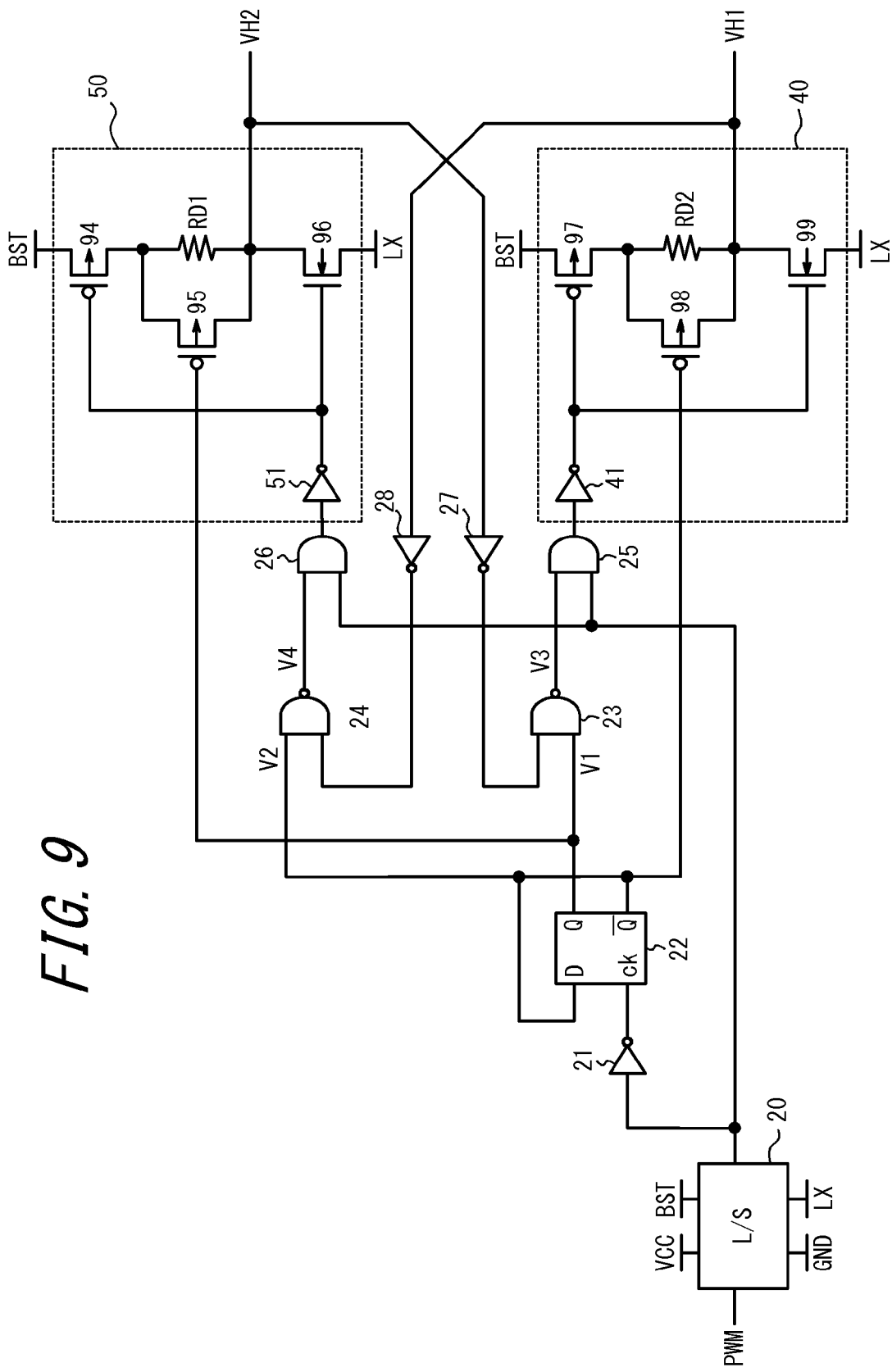
FIG. 9 illustrates a modification to the controller in FIG. 1.

FIG. 9 illustrates another embodiment of the controller. FIG. 9 is an example of taking a measure against Electro Magnetic Interference (EMI). A description of the structure in FIG. 9 that is the same as FIG. 3 is omitted below as appropriate, so as to focus on the differences.

In FIG. 9, instead of the driver circuits DRVH1-1 and DRVH1-2 in FIG. 3, driver circuits 40 and 50 in which an EMI measure has been taken are provided.

The driver circuit 50 includes a NOT circuit 51, transistor switches 94, 95, and 96, and a resistor RD1. The transistor switches 94 and 95 are, for example, p-type MOSFETs, and the transistor switch 96 is, for example, a n-type MOSFET. The signal output by the AND circuit 26 is provided, via the NOT circuit 51, to the gate of the transistor switch 94 and the gate of the transistor switch 96. The signal V1 output by the latch circuit 22 is provided to the gate of the transistor switch 95.

The source of the transistor switch 94 is connected to the power source BST, and the drain is connected to the source of the transistor switch 95 and to the resistor RD1. The drain of the transistor switch 96 is connected to the drain of the transistor switch 95 and to the resistor RD1. The source of the transistor switch 96 is connected to the power source LX.

The signal VH2 generated in the driver circuit 50 is provided to the NAND circuit 23 via the NOT circuit 27.

The driver circuit 40 includes a NOT circuit 41, n-type transistor switches 97, 98, and n-type transistor 99, and a resistor RD2. The transistor switches 97 and 98 are, for example, p-type MOSFETs, and the transistor switch 99 is, for example, a n-type MOSFET. The signal output by the AND circuit 25 is provided, via the NOT circuit 41, to the gate of the transistor switch 97 and the gate of the transistor switch 99. The signal V2 output by the latch circuit 22 is provided to the gate of the p-type transistor switch 98.

The source of the transistor switch 97 is connected to the power source BST, and the drain is connected to the source of the transistor switch 98 and to the resistor RD2. The drain of the p-type transistor switch 99 is connected to the drain of the transistor switch 98 and to the resistor RD2. The source of the transistor switch 99 is connected to the power source LX.

The signal VH1 generated in the driver circuit 40 is provided to the NAND circuit 24 via the NOT circuit 28.

In the driver circuit 50 with the above-described structure, when the transistor switch 94 is on, the transistor switch 95 is off, and the transistor switch 96 is on, then the transistor switch 94 and the resistor RD1 are in a conducting state. At this time, the signal VH2 output by the driver circuit 50 passes through the resistor RD1, and the rise is correspondingly slower.

In the driver circuit 50, when the transistor switch 94, the transistor switch 95 are on or enabled, and the transistor switch 96 is off, then the transistor switch 94, the transistor switch 95 are in a conducting state. At this time, while current corresponding to the resistance flows through the resistor RD1, more current flows through the transistor switch 95 than through the resistor RD1. Therefore, the signal VH2 output by the driver circuit 50 rises quickly.

In the driver circuit 40 with the above-described structure, when the transistor switch 97 is on, the transistor switch 98 is off, and the transistor switch 99 is off, then the transistor switch 97, the resistor RD2 are in a conducting state. At this time, the signal VH1 output by the driver circuit 40 passes through the resistor RD2, and the rise is correspondingly slower.

In the driver circuit 40, when the transistor switch 97, the transistor switch 98 are on, and the transistor switch 99 is off, then the transistor switch 97, the transistor switch 98 are in a conducting state. At this time, while current corresponding to the resistance flows through the resistor RD2, more current flows through the transistor switch 98 than through the resistor RD2. Therefore, the signal VH1 output by the driver circuit 40 rises quickly.

Figure 10:
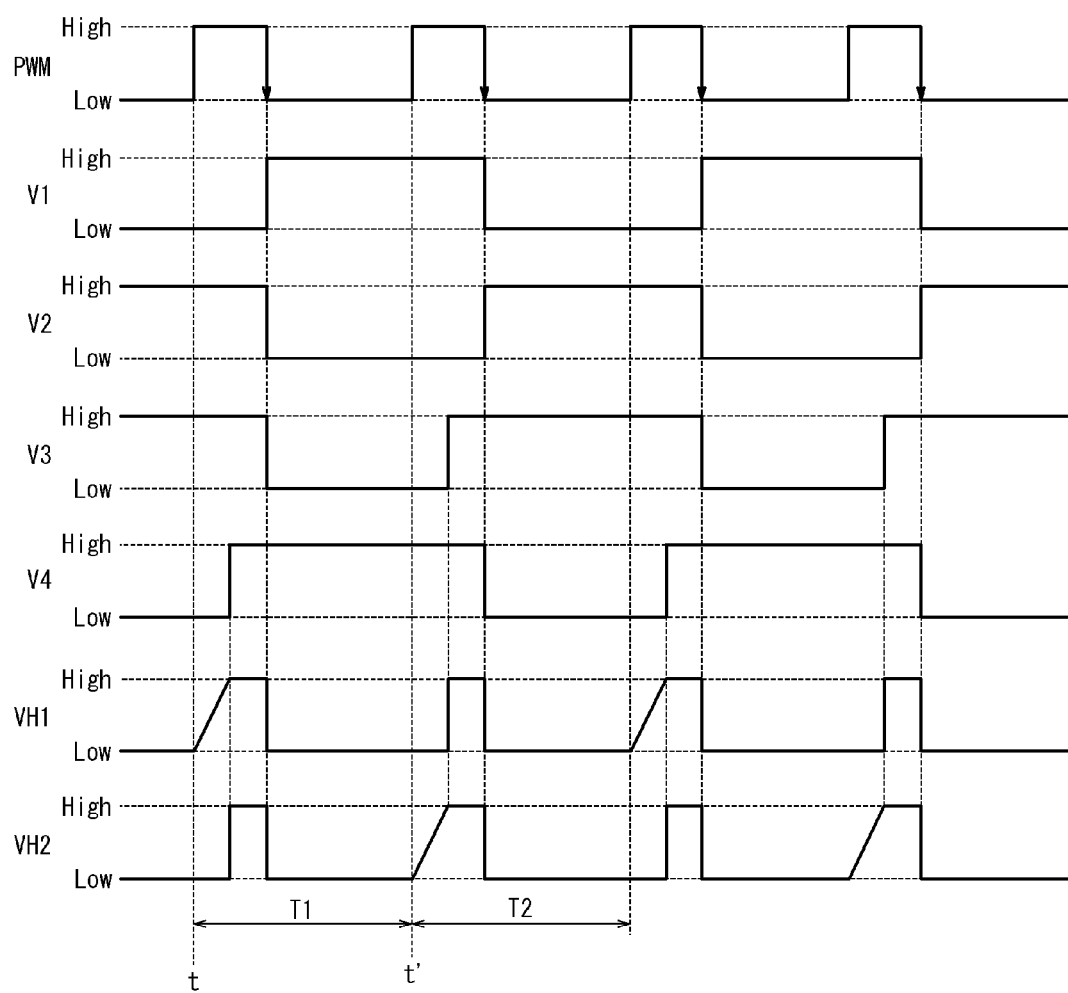
FIG. 10 is a waveform diagram illustrating the relationship between signals in the configuration illustrated in FIG. 9.

FIG. 10 is a waveform diagram illustrating the relationship between signals in the configuration illustrated in FIG. 9. FIG. 10 illustrates the relationship between the PWM signal input to and amplified by the level shift circuit 20, the signals V1 and V2 output by the latch circuit 22, the signal V3 output by the NAND circuit 23, the signal V4 output by the NAND circuit 24, and the signals VH1 and VH2 output respectively from the driver circuits 40 and 50.

As illustrated in FIG. 10, when the PWM signal changes from Low to High at the start time t of cycle T1, the signal VH1 changes from Low to High. At this time, in the structure illustrated in FIG. 9, current is conducted through the resistor RD2, as described above, and therefore the signal VH1 output by the driver circuit 40 rises more gradually than in the waveform diagram in FIG. 4. Once the signal V4 changes from Low to High, the transistor switch 94, the transistor switch 95, and the transistor switch 96 enter into a conducting state. At this time, as described above, a large amount of current flows into the transistor switch 95, and therefore the signal VH2 rises quickly, as illustrated in FIG. 10.

In cycle T2 that follows cycle T1, the signal VH2 changes from Low to High at the start time t'. At this time, the signal VH2 rises gradually. Next, once the signal V3 changes from Low to High, the transistor switch 97, the transistor switch 98, and the transistor switch 99 enter into a conducting state, and the signal VH1 rises quickly, as illustrated in FIG. 10.

In the structure illustrated in FIG. 9 as well, cycles are thus repeated to successively change the signals VH1 and VH2 to High, with the order of the signals alternating. As a result, the switching circuit HM1-1 and the switching circuit HM1-2 are successively turned on in alternating order.

Figure 11:
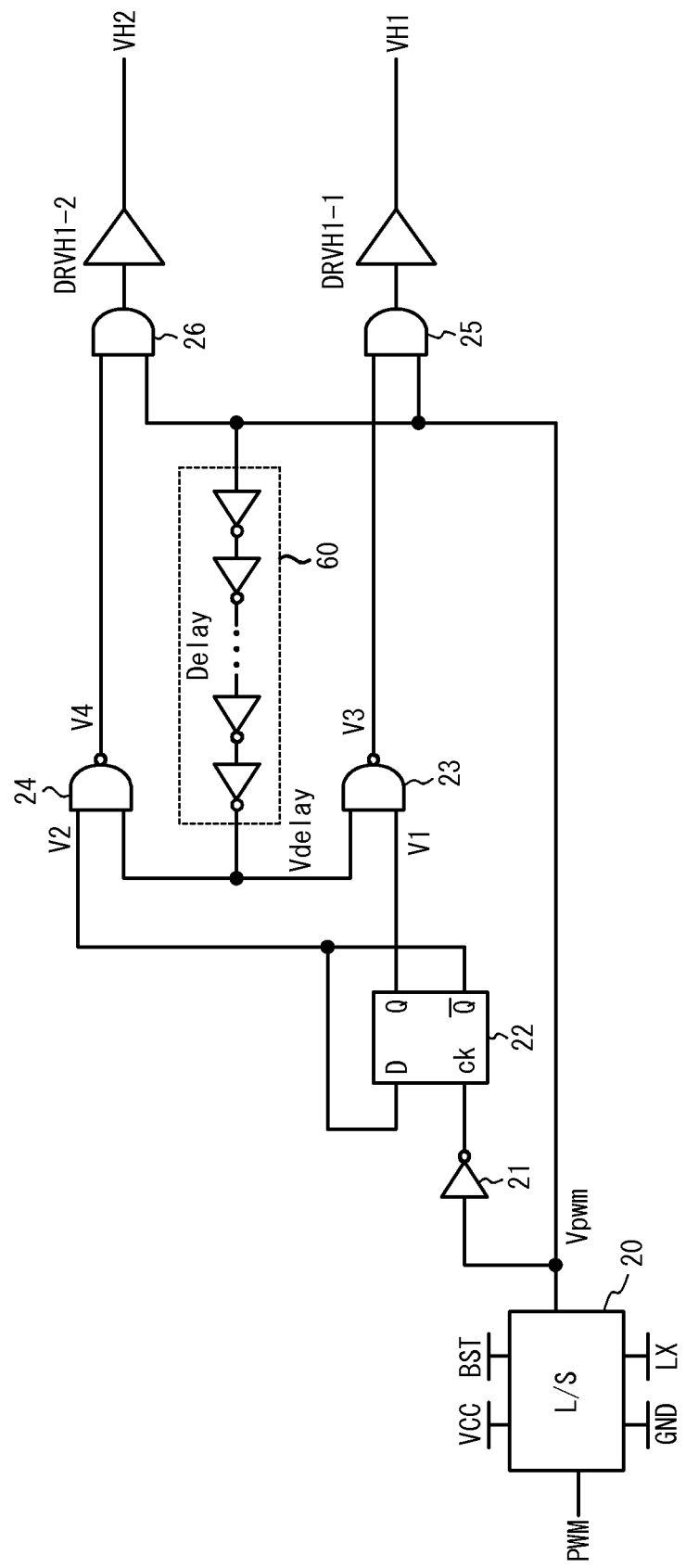
FIG. 11 illustrates another modification to the controller in FIG. 1.

FIG. 11 illustrates another embodiment to the controller. This controller illustrates an example of using a delay circuit. A description of the structure in FIG. 11 that is the same as the embodiment illustrated in FIG. 3 is omitted below as appropriate, so as to focus on the differences.

In the structure illustrated in FIG. 11, the NOT circuits 27 and 28 are omitted, unlike the embodiment illustrated in FIG. 3. Accordingly, the inverted signal of the signal VH2 generated by the driver circuit DRVH1-2 and the inverted signal of the signal VH1 generated by the driver circuit DRVH1-1 are not provided to the NAND circuits 23 and 24. Instead of these signals, in the structure illustrated in FIG. 11, a signal output by the level shift circuit 20 (Vpwm) is provided to the NAND circuit 23 and the NAND circuit 24 via a delay circuit 60.

The NAND circuit 23 inverts the logical conjunction of the signal V1 provided by the latch circuit 22 and the signal Vdelay provided by the delay circuit 60 and outputs the resulting signal V3. The NAND circuit 24 inverts the logical conjunction of the signal V2 provided by the latch circuit 22 and the signal Vdelay provided by the delay circuit 60 and outputs the resulting signal V4.

Figure 12:
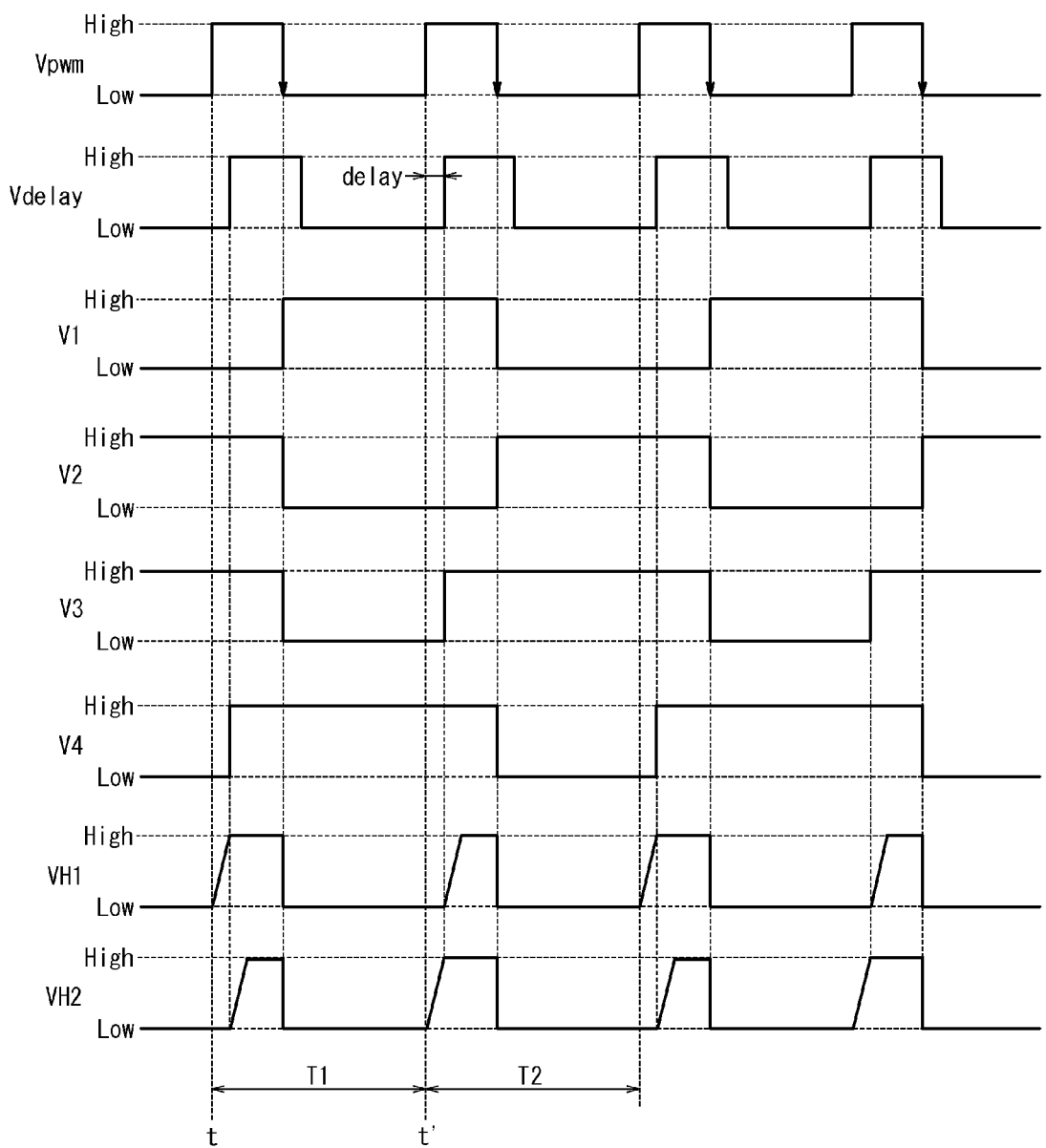
FIG. 12 is a waveform diagram illustrating the relationship between signals in the configuration illustrated in FIG. 11.

FIG. 12 is a waveform diagram illustrating the relationship between signals in the configuration illustrated in FIG. 11. As illustrated in FIG. 12, a structure provided with the delay circuit also allows for output of signals VH1 and VH2 similar to the signals output VH1 and VH2 of the embodiment of controller illustrated in FIG. 3.

While DC-DC converter 10, as illustrated in FIG. 1, may include two switching circuits (MOSFETs) HM1-1 and HM1-2 as described in the above embodiment, the number of switching circuits (MOSFETs) provided in the DC-DC converter 10 need not be two. The DC-DC converter 10 may be provided with three or more switching circuits. The control circuit may also be designed to accommodate the number of switching circuits provided in the DC-DC converter 10. For example, as illustrated in FIG. 13, the DC-DC converter is provided with four switching circuits, the controller is configured to generate four signals, VH1, VH2, VH3, and VH4, for on/off control of the four switching circuits.

Figure 13:
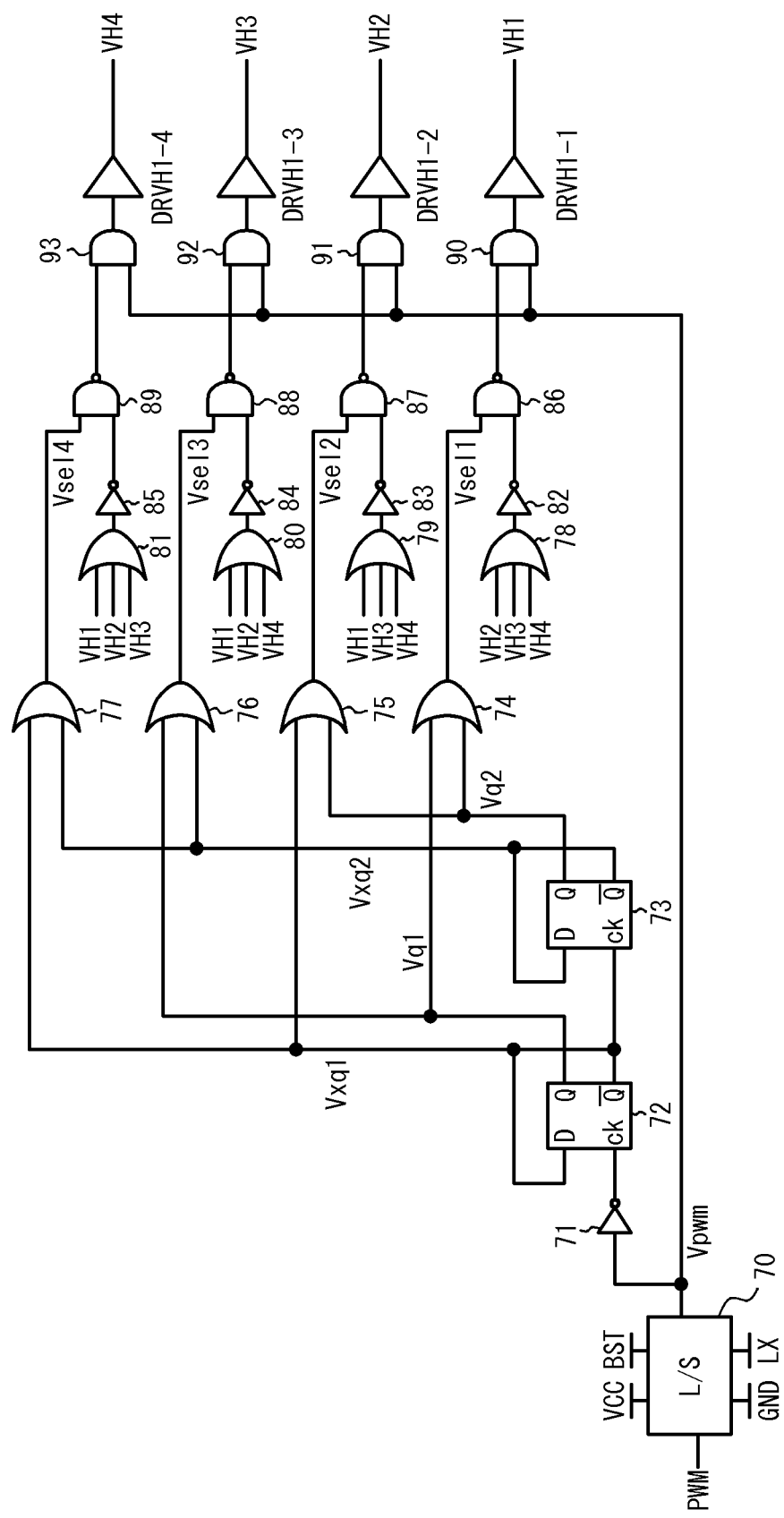
FIG. 13 illustrates an example of a controller.

FIG. 13 illustrates an example of a controller that controls four switching circuits. This controller includes a level shift circuit 70, NOT circuits 71, 82, 83, 84, and 85, latch circuits 72 and 73, OR circuits 74, 75, 76, 77, 78, 79, 80, and 81, NAND circuits 86, 87, 88, and 89, AND circuits 90, 91, 92, and 93, and driver circuits DRVH1-1, DRVH1-2, DRVH1-3, and DRVH1-4.

The functions of the level shift circuit 70 are similar to those of the level shift circuit 20 in FIG. 3.

A signal Vq1 output as the output Q of the latch circuit 72 and a signal Vq2 output by the output Q of the latch circuit 73 are provided to the OR circuit 74. The OR circuit 74 provides a signal Vsel1, which is the logical sum of the provided signals Vq1 and Vq2, to the NAND circuit 86. Accordingly, the signal Vsel1 output by the OR circuit 74 is Low when both of the signals Vq1 and Vq2 are Low and is High when at least one of the signals Vq1 and Vq2 is High.

A signal Vxq1 output as the inversion of the output Q of the latch circuit 72 and a signal Vq2 output as the output Q of the latch circuit 73 are provided to the OR circuit 75. The OR circuit 75 provides a signal Vsel2, which is the logical sum of the provided signals Vxq1 and Vq2, to the NAND circuit 87. Accordingly, the signal Vsel2 output by the OR circuit 75 is Low when both of the signals Vxq1 and Vq2 are Low and is High when at least one of the signals Vxq1 and Vq2 is High.

The signal Vq1 output as the output Q of the latch circuit 72 and a signal Vxq2 output as the inversion of the output Q of the latch circuit 73 are provided to the OR circuit 76. The OR circuit 76 provides a signal Vsel3, which is the logical sum of the provided signals Vq1 and Vxq2, to the NAND circuit 88. Accordingly, the signal Vsel3 output by the OR circuit 76 is Low when both of the signals Vq1 and Vxq2 are Low and is High when at least one of the signals Vq1 and Vxq2 is High.

The signal Vxq1 output as the inversion of the output Q of the latch circuit 72 and the signal Vxq2 output as the inversion of the output Q of the latch circuit 73 are provided to the OR circuit 77. The OR circuit 77 provides a signal Vsel4, which is the logical sum of the provided signals Vxq1 and Vxq2, to the NAND circuit 89. Accordingly, the signal Vsel4 output by the OR circuit 77 is Low when both of the signals Vxq1 and Vxq2 are Low and is High when at least one of the signals Vxq1 and Vxq2 is High.

The signal VH2 generated by the driver circuit DRVH1-2, the signal VH3 generated by the driver circuit DRVH1-3, and the signal VH4 generated by the driver circuit DRVH1-4 are provided to the OR circuit 78. The OR circuit 78 outputs a signal that is the logical sum of the input signals VH2, VH3, and VH4. This signal is inverted by the NOT circuit 82 and provided to the NAND circuit 86. Accordingly, the signal provided to the NAND circuit 86 is High when any of the signals VH2, VH3, and VH4 is Low, and is Low when any of the signals VH2, VH3, and VH4 is High.

The signal VH1 generated by the driver circuit DRVH1-1, the signal VH3 generated by the driver circuit DRVH1-3, and the signal VH4 generated by the driver circuit DRVH1-4 are provided to the OR circuit 79. Like the OR circuit 78, the OR circuit 79 outputs a signal that is the logical sum of the input signals VH1, VH3, and VH4. This signal is inverted by the NOT circuit 83 and provided to the NAND circuit 87.

The signal VH1 generated by the driver circuit DRVH1-1, the signal VH2 generated by the driver circuit DRVH1-2, and the signal VH4 generated by the driver circuit DRVH1-4 are provided to the OR circuit 80. Like the OR circuit 78, the OR circuit 80 outputs a signal that is the logical sum of the input signals VH1, VH2, and VH4. This signal is inverted by the NOT circuit 84 and provided to the NAND circuit 88.

The signal VH1 generated by the driver circuit DRVH1-1, the signal VH2 generated by the driver circuit DRVH1-2, and the signal VH3 generated by the driver circuit DRVH1-3 are provided to the OR circuit 81. Like the OR circuit 78, the OR circuit 81 outputs a signal that is the logical sum of the input signals VH1, VH2, and VH3. This signal is inverted by the NOT circuit 85 and provided to the NAND circuit 89.

The NAND circuit 86 inverts the logical conjunction of the signal Vsel1 provided by the OR circuit 74 and the signal provided by the NOT circuit 82 and provides the result to the AND circuit 90. Accordingly, when both the signal Vsel1 and the signal provided by the NOT signal 82 are High, the signal provided to the AND circuit 90 is Low. Conversely, when at least one of the signal Vsel1 and the signal provided by the NOT signal 82 is Low, the signal provided to the AND circuit 90 is High. Like the NAND circuit 86, the NAND circuits 87, 88, and 89 respectively provide a signal that is the inversion of the logical conjunction of the input signals to the AND circuits 91, 92, and 93.

The AND circuit 90 outputs a signal that is the logical conjunction of the signal (Vpwm) provided by the level shift circuit 70 and the signal provided by the NAND circuit 86 to the driver circuit DRVH1-1. Accordingly, when both the signal Vpwm and the signal provided by the NAND circuit 86 are High, the signal provided to the driver circuit DRVH1-1 is High. Conversely, when at least one of the signal Vpwm and the signal provided by the NAND circuit 86 is Low, the signal provided to the driver circuit DRVH1-1 is Low. By outputting the signal VH1 based on the signal provided by the AND circuit 90, the driver circuit DRVH1-1 performs on/off control of one switching circuit.

Like the AND circuit 90, the AND circuits 91, 92, and 93 output a signal that is the logical conjunction of the signal (Vpwm) provided by the level shift circuit 70 and the signal provided by the respective NAND circuits 87, 88, and 89 to the driver circuits DRVH1-2, DRVH1-3, and DRVH1-4. By outputting the signals VH2, VH3, and VH4 based on the signals provided by the respective AND circuits 91, 92, and 93, the driver circuits DRVH1-2, DRVH1-3, and DRVH1-4 each perform on/off control of one switching circuit.

Figure 14:
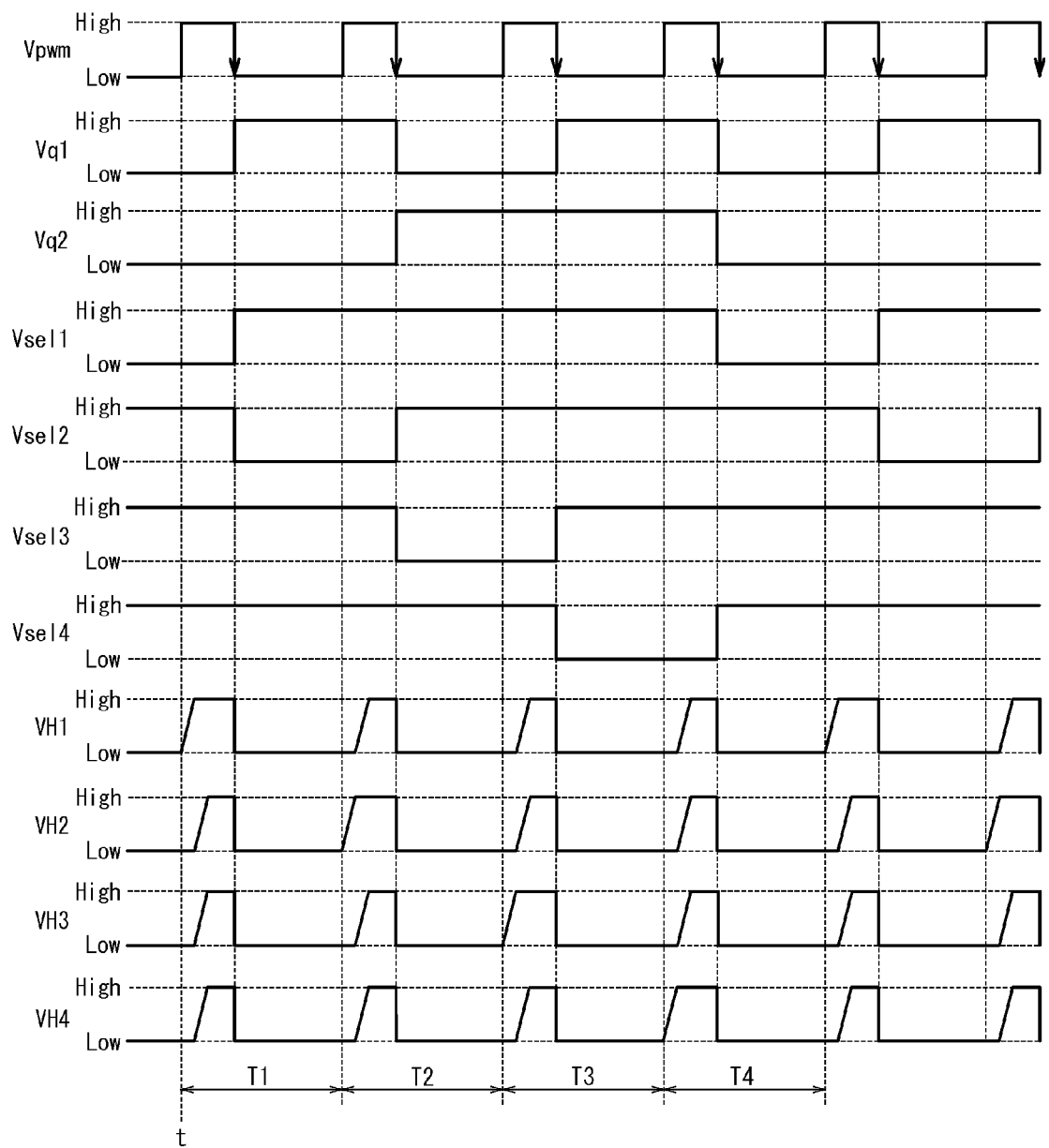
FIG. 14 is a waveform diagram illustrating the relationship between signals in the configuration illustrated in FIG. 13.

FIG. 14 is a waveform diagram illustrating the relationship between signals in the configuration illustrated in FIG. 11. The waveform diagram in FIG. 14 illustrates the relationship between the signal Vpwm output by the level shift circuit 70, the signal Vq1 output by the latch circuit 72, the signal Vq2 output by the latch circuit 73, the signal Vsel1 output by the OR circuit 74, the signal Vsel2 output by the OR circuit 75, the signal Vsel3 output by the OR circuit 76, the signal Vsel4 output by the OR circuit 77, the signal VH1 output by the driver circuit DRVH1-1, the signal VH2 output by the driver circuit DRVH1-2, the signal VH3 output by the driver circuit DRVH1-3, and the signal VH4 output by the driver circuit DRVH1-4.

As illustrated in FIG. 14, during cycle T1, at the start time t, the signals Vq1 and Vq2 are both Low, and therefore the signal Vsel1 output by the OR circuit 74 is Low. Since the signal Vsel1 is Low, the signal output by the NAND circuit 86 is High. Therefore, once the signal Vpwm changes from Low to High at time t, the signal VH1 changes from Low to High. Since the signal VH1 input into the OR circuits 79, 80, and 81 becomes High as a result, the signal input into the NAND circuits 87, 88, and 89 becomes High. Hence, the signals VH2, VH3, and VH4 change from Low to High. During cycle T1, the switching circuit controlled by the signal VH1 is turned on first, and the switching circuits controlled by the signals VH2, VH3, and VH4 are subsequently turned on. Once the PWM signal changes from High to Low, the signals VH1, VH2, VH3, and VH4 change from High to Low, and the four switching circuits go from being on to being off.

In cycle T2 that follows cycle T1, the signal VH2 first changes from Low to High, and subsequently, the signals VH1, VH3, and VH4 change from Low to High. In cycle T3 that follows cycle T2, the signal VH3 first changes from Low to High, and subsequently, the signals VH1, VH2, and VH4 change from Low to High. In cycle T4 that follows cycle T3, the signal VH4 first changes from Low to High, and subsequently, the signals VH1, VH2, and VH3 change from Low to High. Via control by the controller, these cycles T1 to T4 are repeated.

In this way, when provided with four switching circuits, the DC-DC converter is structured to repeat the above-described first through fourth cycles to turn the four switching circuits on in order. In other words, this structure repeats control to turn the four switching circuits on in a predetermined order in each cycle. As a result, charge current can be prevented from flowing into any one switching circuit, making it easier to prevent a concentration of heat buildup in one switching circuit as compared to the other switching circuits.

In the above embodiment, an example has been described of a step-down DC-DC converter that includes the two high-side switching circuits HM1-1 and HM1-2 and one low-side switching circuit LM1, yet this disclosure is not limited to the above-described step-down DC-DC converter. For example, a step-up DC-DC converter may also be implemented with this disclosure.

Figure 15:
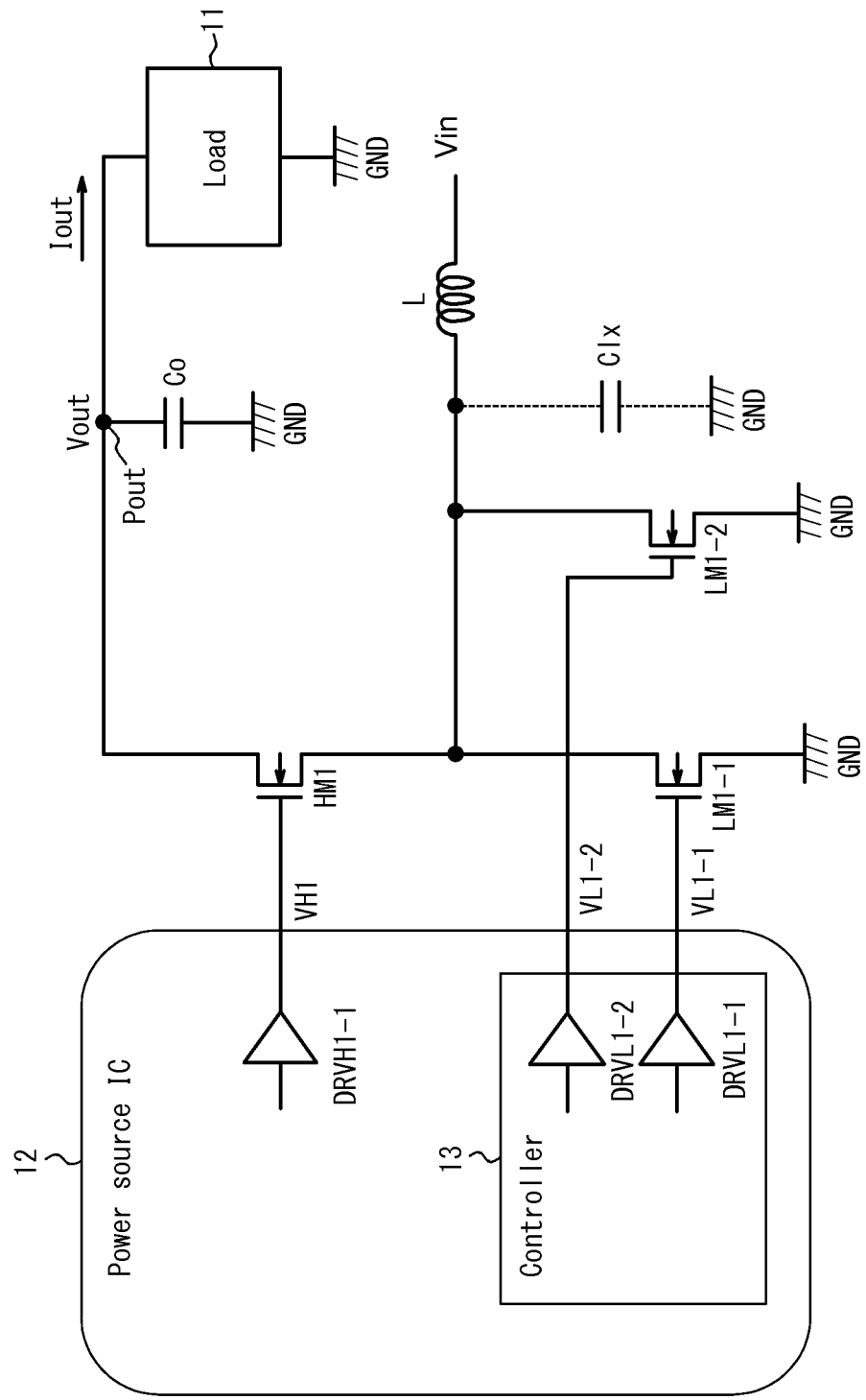
FIG. 15 illustrates a modification to the circuit in the DC-DC converter.

FIG. 15 schematically illustrates an embodiment of a step-up DC-DC converter. This DC-DC converter includes one high-side switching circuit HM1 and two low-side switching circuits LM1-1 and LM1-2. Voltage that is temporally divided by turning the high-side switching circuit HM1 and the low-side switching circuits LM1-1 and LM1-2 on and off is smoothed by the inductor L and capacitor Co and supplied to the load 11. In this case, the low-side switching circuits LM1-1 and LM1-2 are disposed in parallel between the load 11 and the ground GND. Via the control signals from the driver circuits DRVL1-1 and DRVL1-2, the controller 13 performs control to turn the low-side switching circuits LM1-1 and LM1-2 on successively, while alternating the order in which these switching circuits are turned on. As a result, the charge current caused by the parasitic capacitance Clx can be dispersed over time between both of the switching circuits LM1-1 and LM1-2, thus allowing for dispersion of overall heat generation in the switching circuits LM1-1 and LM1-2. Accordingly, the circuit as a whole can reduce the energy loss due to heat.

In one embodiment, a step-up and step-down DC-DC converter may also be implemented with this disclosure.

Figure 16:
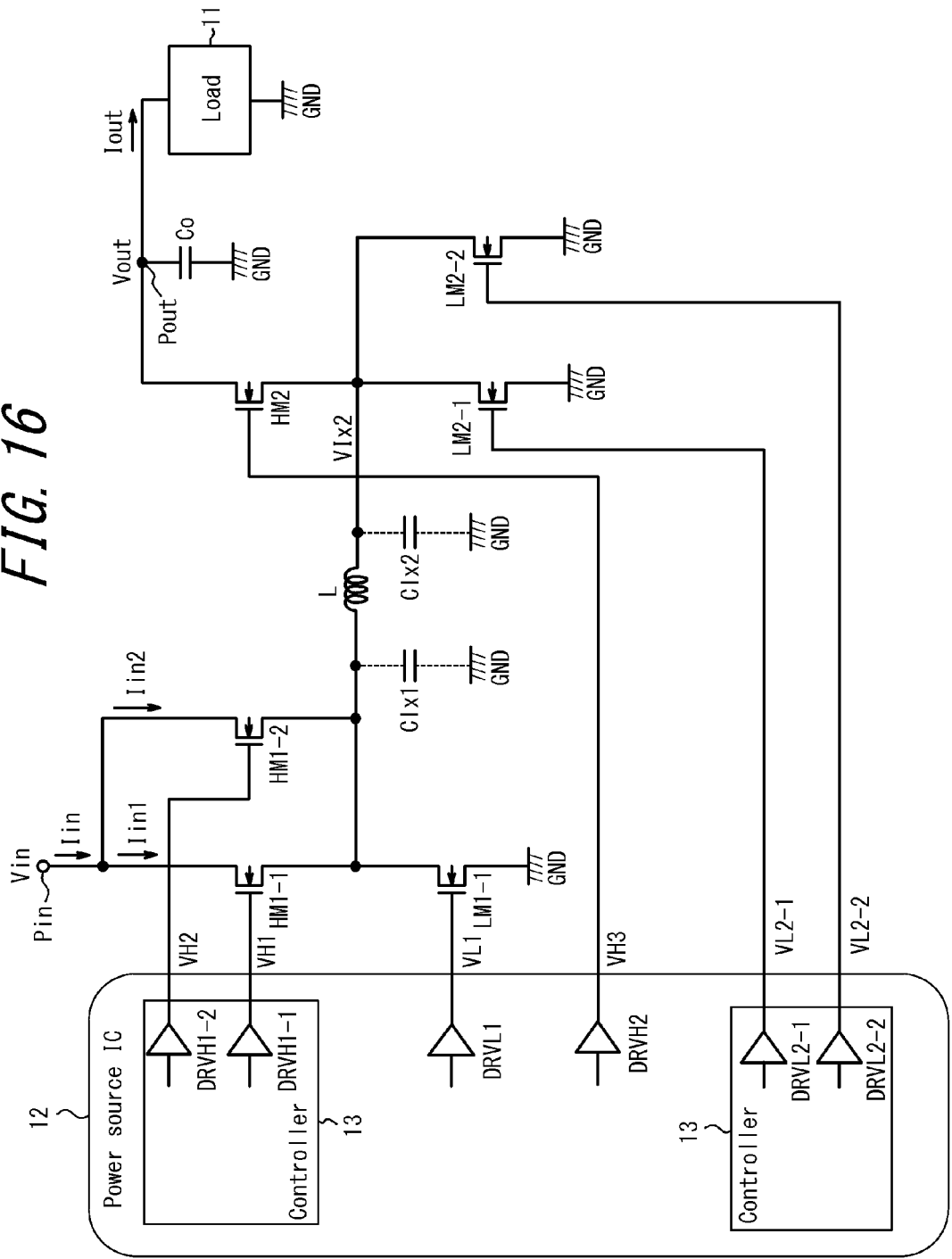
FIG. 16 illustrates another modification to the circuit in the DC-DC converter.

FIG. 16 schematically illustrates an embodiment of a step-up and step-down DC-DC converter. This DC-DC converter is an example combining the structure of the step-down DC-DC converter illustrated in FIG. 1 and the step-up DC-DC converter illustrated in FIG. 15. In other words, the portion forming a step-down DC-DC converter includes high-side switching circuits HM1-1 and HM1-2 disposed in parallel; a low-side switching circuit LM1-1; driver circuits DRVH1-1, DRVH1-2, and DRVL1 that each input a control signal into a switching circuit; a controller 13 that includes the driver circuits DRVH1-1 and DRVH1-2; and an inductor L and condenser Co that form a smoothing filter. The portion forming a step-up DC-DC converter includes a high-side switching circuit HM2; low-side switching circuits LM2-1 and LM2-2 disposed in parallel; driver circuits DRVH2, DRVL2-1, and DRVL2-2 that each input a control signal into a switching circuit; a controller 13 that includes the driver circuits DRVL2-1 and DRVL2-2; and an inductor L and condenser Co that form a smoothing filter. The operations and effects of stepping up and stepping down are the same as those described in FIGS. 1 to 15.

Although exemplary embodiments have been described with reference to the accompanying drawings, it is to be noted that various changes and modifications will be apparent to those skilled in the art based on this disclosure. Therefore, such changes and modifications are to be understood as included within the scope of this disclosure. For example, the functions and the like included in each component may be reordered in any logically consistent way. Furthermore, structural components and the like may be combined into one or divided.

What is claimed is:

1. A DC-DC converter comprising:
an input terminal receiving voltage input;
first and second switching circuits connected in parallel between the input terminal and a ground;
an output terminal outputting converted voltage; and
a controller configured to operate the first and second switching circuits in first and second predetermined cycles by inputting, into each of the first and second switching circuits, a control signal that turns the first and second switching circuits on individually, wherein during the first predetermined cycle, the first switch circuit is turned on first, and during the second predetermined cycle, the second switch circuit is turned on first.

2. The DC-DC converter of claim 1, wherein the controller is configured to perform control to turn the first and second switching circuits on sequentially.

3. The DC-DC converter of claim 2, wherein the controller is configured to repeat the control.

4. The DC-DC converter of claim 1, wherein the first and second switching circuits include high-side switching circuits.

5. The DC-DC converter of claim 1, wherein the first and second switching circuits include low-side switching circuits.

6. The DC-DC converter of claim 1, wherein the first and second predetermined cycles are alternating cycles.

7. The DC-DC converter of claim 2, further comprising:
a plurality of additional switching circuits connected in parallel between the input terminal and the ground, wherein the controller is further configured to operate the additional switching circuits in a plurality of additional predetermined cycles, wherein in each of the plurality of additional predetermined cycles, one of the plurality of additional switching circuits is turned on first.

8. The DC-DC converter of claim 1, further comprising:
a resistor coupled between the controller and at least one of the first or second switching circuits.

9. The DC-DC converter of claim 1, wherein the first and second predetermined cycles include a same time period.

10. A method, comprising:
coupling a first and second switching circuits in parallel between an input terminal and ground, and between the input terminal and an output terminal;
coupling a controller to each of the first and second switching circuits individually;
generating, using the controller, first and second control signals;
coupling the first and second control signals to the first and second switching circuits respectively; and
controlling, using the first and second control signals respectively, the first and second switching circuits, wherein the first switching circuit is turned on first in a first cycle, and the second switching circuit is turned on first in a second cycle, and wherein the first and second cycles are alternating.

11. The method of claim 10, further comprising:
configuring, using the controller, a same time period for the first and second cycles.

12. The method of claim 10, wherein generating the first and second control signals includes overlapping at least a portion of the first and second control signals.

13. The method of claim 10, wherein controlling the first and second switching circuits includes turning on the first and second circuits sequentially according to the first and second control signals respectively.

14. The method of claim 10, wherein the first and second control signals include pulse width modulation (PWM) signals.

15. An automotive power supply system, comprising:
a power supply;
a plurality of voltage converters, each including an input terminal receiving voltage input from the power supply, first and second switching circuits connected in parallel between the input terminal and a ground node, an output terminal outputting converted voltage, and a controller configured to operate the first and second switching circuits in first and second time cycles by inputting, into each of the first and second switching circuits, a control signal that turns the first and second switching circuits on individually, wherein during the first time cycle, the first switch circuit is turned on first, and during the second time cycle, the second switch circuit is turned on first; and
a plurality of automotive control circuits, each configured to receive the converted voltage from at least one of the output terminals of the plurality of voltage converters.

16. The automotive power supply system of claim 15, wherein the first and second switching circuits include metal-oxide-semiconductor field-effect transistors (MOSFET), gates of the MOSFETs configured to receive the control signals from the controllers.

17. The automotive power supply system of claim 15, wherein the first and second switching circuits include high-side switching circuits.

18. The automotive power supply system of claim 15, wherein the first and second switching circuits include low-side switching circuits.

19. The automotive power supply system of claim 15, wherein the first and second time cycles include a same time period.

20. The automotive power supply system of claim 15, wherein the first and second time cycles are alternating.

* * * * *